United States Patent
Suri et al.

(10) Patent No.: US 6,813,373 B1
(45) Date of Patent: Nov. 2, 2004

(54) IMAGE SEGMENTATION OF EMBEDDED SHAPES USING CONSTRAINED MORPHING

(75) Inventors: Jasjit S. Suri, Mayfield Heights, OH (US); Kecheng Liu, Solon, OH (US); Laura M. Reden, Lyndhurst, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 583 days.

(21) Appl. No.: 09/825,028

(22) Filed: Apr. 3, 2001

(51) Int. Cl.[7] ............................................... G06K 3/00
(52) U.S. Cl. .................... 382/128; 382/285; 382/308
(58) Field of Search .............................. 382/128, 171, 382/173, 308, 385, 154, 106; 324/306; 345/419, 420, 422; 378/4, 41, 57; 600/117, 407, 408, 459; 606/130; 700/112

(56) References Cited

U.S. PATENT DOCUMENTS

| | | | |
|---|---|---|---|
| 4,710,876 A | | 12/1987 | Cline et al. .................. 345/423 |
| 4,729,098 A | | 3/1988 | Cline et al. .................. 345/421 |
| 4,751,643 A | * | 6/1988 | Lorensen et al. ........... 382/132 |
| 5,005,578 A | * | 4/1991 | Greer et al. ................. 600/414 |
| 5,048,095 A | | 9/1991 | Bhanu et al. ................ 382/173 |
| 5,185,209 A | * | 2/1993 | Zupancic ..................... 428/457 |
| 5,185,809 A | * | 2/1993 | Kennedy et al. ............ 382/131 |
| 5,187,658 A | * | 2/1993 | Cline et al. .................. 382/128 |
| 5,239,591 A | | 8/1993 | Ranganath .................. 382/128 |
| 5,332,968 A | * | 7/1994 | Brown ......................... 324/309 |
| 5,433,199 A | | 7/1995 | Cline et al. .................. 600/413 |
| 5,490,516 A | * | 2/1996 | Hutson ........................ 600/508 |
| 5,568,384 A | * | 10/1996 | Robb et al. .................. 715/532 |
| 5,655,028 A | * | 8/1997 | Soll et al. .................... 382/133 |
| 5,687,737 A | * | 11/1997 | Branham et al. ........... 600/523 |
| 5,709,206 A | * | 1/1998 | Teboul ......................... 600/437 |
| 5,806,521 A | * | 9/1998 | Morimoto et al. .......... 600/447 |
| 5,827,499 A | * | 10/1998 | Metz et al. .................. 424/1.73 |
| 5,871,019 A | * | 2/1999 | Belohlavek .................. 600/450 |
| 5,990,897 A | * | 11/1999 | Hanratty ...................... 345/420 |
| 6,018,499 A | | 1/2000 | Sethian et al. ............... 367/72 |

OTHER PUBLICATIONS

Burdin et al., "Modeling and Analysis of 3–D Elongated Shapes with Applications to Long Bone Morphometry", IEEE Transactions on Medical Imaging, Feb. 1996, pp. 79–91.*

Joliot et al., Three–Dimensional Segmentation and Interpolation of Magnetic Resonance Brain Images, IEEE Transactios on Medical Imaging, Jun. 1993, pp. 269–277.*

(List continued on next page.)

*Primary Examiner*—Yon J. Couso
(74) *Attorney, Agent, or Firm*—Fay, Sharpe, Fagan, Minnich & McKee, LLP

(57) ABSTRACT

An imaging system and method enables 3-D direct segmentation from a series of spatially offset 2-D image slices in a volume scan. The algorithm first smoothes and preserves the interface edges of the image volume using Bottom-Hat gray scale morphological transform followed by 3-D segmentation using fast 3-D level sets by preserving topology constraints, for example, cortical thickness in a brain volume. The method inputs opposite polarity spheres (contracting and expanding spheres) which morph into shapes within the volume using a surface propagation technique. The speed of propagation is controlled by the likelihood statistical component derived under constraints. During the propagation polygonalization extracts the zero-level surface set. The field distribution is computed using the improved shortest distance method or polyline distance method. The morphing algorithm then morphs the input concentric spheres into interface surfaces such as WM-GM and GM-CSF with cortical constraint. The system is optimized by computing the 3-D field in the narrow band on the morphing spheres.

21 Claims, 20 Drawing Sheets

OTHER PUBLICATIONS

Medical Computer Vision, Virtual Reality and Robotics by Nicholas Ayache; Image and Vision Computing vol. 13, No. 4, May 1995.

Computer–Assisted Interactive Three–Dimensional Planning for Neurological Procedures by Ron Kikinis, M.D., et al.; Neurosurgery, vol. 38, No. 4, Apr. 1996.

The use of Computerized Image Processing for Neurological Planning by Ferenc A. Jolesz, et al.; Blackwell Scientific, 1993.

Automatic Segmentation of the Brain from MRI–T1 Data—Chapter 2 by N. Ayache, 1996.

Leaking Prevention in Fast Level Sets Using Fuzzy Models: An Application in MR Brain by Jasjit S. Suri, Ph.D; Magnetic Resonance Clinical Science Div., Marconi Medical Systems, Inc.; Inter. Conference in Information Technology in Biomedicine, Nov. 2000.

A Unified Geometric Model for 3–D Confocal Image Analysis in Cytology by A. Sarti, et al.; Lawrence Berkeley National Laboratory, Univ. of California, 1998.

Greedy Algorithm for Error Correction in Automatically Produced Boundaries from Low Contrast Ventriculograms by J. Suri, et al.; Pattern Analysis & Applications, 2000.

Computer Vision, Pattern Recognition and Image Processing in Left Ventricle Segmentation: The last 50 Years by Jasjit S. Suri; Image Guided Surgery, Marconi Medical Systems, 2000.

Feature Extraction for MRI Segmentation by Robert P. Velthuizen, Ph.D, et al.; American Society of Neuroimaging, 1999.

From Retinotopy to Recognition: fMRI in Human Visual Cortex by Roger G.H. Tootell, et al.; Trends in Cognitive Sciences, vol. 2, No. 5, May 1998.

Segmentation of Hippocampus From Brain MRI Using Deformable Contours by Amir Ghanei, et al.; Computerized Medical Images and Graphics (CMIG), vol. 22, No. 3, pp. 203–216, May–Jun. 1998.

Marching Cubes: A High Resolution 3D Surface Construction Algorithm by William E. Lorensen, et al.; Computer Graphics, vol. 21, No. 4, Jul. 1987.

Skeleton Climbing: Fast Isosurfaces With Fewer Triangles by Tom Poston, at al., Oct. 1997.

Geometrically Deformed Models: A Method for Extracting Closed Geometric Models from Volume Data by James V. Miller, et al.; Computer Graphics, vol. 25, No. 4, Jul. 1991.

Segmentation and Measurement of the Cortex from 3–D MR Images Using Coupled–Surfaces Propagation by Xiaolan Zeng, et al.; IEEE Transactions on Medical Imaging, vol. 18, No. 10, Oct. 1999.

Interactive 3D Segmentation of MRI and CT Volumes Using Morphological Operations by Karl Heinz Höhne, et al.; Journal of Computer Assisted Tomography, Mar./Apr. 1992.

* cited by examiner

IMAGE MATRIX

IMAGE SEGMENTATION OF EMBEDDED SHAPES USING CONSTRAINED MORPHING

BACKGROUND OF THE INVENTION

The present application relates to diagnostic medical imaging. The invention finds particular application in segmenting and quantifying three-dimensional medical image data. It is to be appreciated however, that the present application finds further utility in quickly and accurately converting a series of two-dimensional images into a 3-D representation with accurately defined interfaces between distinct layer.

Quantification of the brain's gray matter, cortical thickness, the atrophy index of sulci in the cortex, and the principal curvatures of the cortex are important and clinically significant for analyzing brain diseases such as Alzheimer's, epilepsy, band heterotopia, dysplasia, schizophrenia, and dementia. The measurements can be computer estimated by accurately segmenting the cortex of the human brain. The above quantification tools also help in analyzing functional brain information such as in functional MRI (fMRI).

Typically, volumetric images are acquired and manipulated as a series of closely spaced, parallel two-dimensional image slices. Rendering this large database of sequential images into three dimensions is prohibitively expensive in computational power and in time. For example, the cerebral sheet at the interface between gray matter (GM) and white matter (WM) in the human brain is about 2500 $cm^2$. The shape and convolutedness of the interface is important in many diagnostic procedures. For example, in neurological surgical planning/navigation and image guided surgery, an objective is to help the neuro-surgeon to plan the neuro-surgery in an operating room to identify the location of the tumor(s) in 3-D coordinates and the critical trajectories through which the tumors are accessed and removed. In surgical navigation, the objective is to navigate using the tools (such as the Y-probe) towards the target (such as a tumor in the brain) while avoiding critical brain structures and their functions during surgery. In Image Guided Surgery, the reconstructed patient's brain anatomy helps surgeons to interactively guide the surgery.

However, while the importance of cortical segmentation has been identified, it has not been easy to develop robust and high speed 3-D image creation and manipulation techniques.

The present invention contemplates an improved method and apparatus which overcomes the above-referenced problems and others.

SUMMARY OF THE INVENTION

In one embodiment of the present invention, a medical imaging method includes retrieving image data for a volume of interest, where the image data comprises a plurality of two-dimensional image slices. The plurality of image slices are transformed via gray scale mathematical morphology open-close and Bottom Hat edge preserving smoothing system into a three-dimensional volume. Interfaces within the three-dimensional volume are then identified.

In accordance with another aspect of the present invention, the transforming comprises applying a mathematical morphology transform to a selected one of the plurality of two-dimensional image slices.

In accordance with another aspect of the present invention, the mathematical morphology transform comprises performing an open smoothing operation and a closing smoothing operation on the selected two-dimensional image slice yielding an open slice and a closed slice. The open slice and the closed slice are then averaged using shifting.

In accordance with another aspect of the present invention, the mathematical morphology transform further comprises applying a Bottom-Hat smoothing system to the averaged slice.

In accordance with another aspect of the present invention, Bottom-Hat edge preservation and smoothing system comprises of a combination of histogramming the gray scale slices and applying a set of image algebra, logical Boolean operators and recursive mathematical morphology.

In accordance with another aspect of the present invention, recursive mathematical morphology comprises of thinning operation on binary images using skeletonization of binary shapes.

In another with another aspect of the present invention, the complete system comprises of linking the edge-preserved image denoising system with image derived constrained morphing system.

In accordance with another aspect of the present invention, the identifying comprises deriving constrained image forces which navigate the deformation process from the three-dimensional volume.

In accordance with another aspect of the present invention the identifying further comprises estimating fields within the three-dimensional volume contained by respective narrow bands.

In accordance with another aspect of the present invention the identifying further comprises under the derived image force constraints and within the narrow bands, propagating the estimated fields yielding updated fields, and checking the updated fields for convergence.

In accordance with another aspect of the present invention, the identifying further comprises estimating an isosurface under a morphological edge-preserved level set framework for each of the updated fields.

In accordance with another aspect of the present invention, the identifying further comprises rendering the updated fields.

In accordance with another aspect of the present invention, the estimating comprises generating a signed distance transform from initial fields or spheres.

In accordance with another aspect of the present invention, the generating comprises obtaining a vertex on one of the spheres, and computing polyline distances in the narrow band to yield accurate distances from the vertex.

In accordance with another aspect of the present invention, a medical image processing method comprises non-linear smoothing and edge-preserving a volume of interest represented by a series of spatially offset images, and segmenting embedded shapes in the smoothed volume of interest.

In accordance with another aspect of the present invention, the smoothing comprises sequentially selecting one of the series of spatially offset images. The selected image is smoothed with an open-close method and transformed with an ensemble of operators: morphology, logical operators, image algebra operators that constitute a bottom-hat morphological transform.

In accordance with another aspect of the present invention, the dynamic segmenting comprises estimating initial surfaces in the volume of interest, propagating the initial surfaces into revised surfaces, extracting an isosurface from the revised surfaces, reinitializing the surfaces, checking for completion, and if incomplete, replacing previous surfaces with the reinitialized surfaces and repeating.

In accordance with another aspect of the present invention, the segmenting comprises deriving constrained morphing forces, computing an initial distribution model, morphing the distribution model by applying the derived forces, and extracting a volume from the morphed distribution model.

In accordance with another aspect of the present invention, the deriving comprises estimating a three-dimensional field distribution from initial spheres, computing data such as normals and offsets for selected voxels in the estimated three-dimensional field distribution, and determining a likelihood probability for a distribution such as WM or GM.

In accordance with another aspect of the present invention, the computing comprises computing a perpendicular distance between a point on an inner sphere and a corresponding point on an outer sphere.

In accordance with another embodiment of the present invention, a medical imaging apparatus comprises means for open smoothing and close smoothing a selected image slice to yield an open slice and a closed slice, means for averaging the open slice and the closed slice, and means for smoothing the averaged slice into a volume image representation.

In accordance with another aspect of the present invention, the imaging apparatus further comprises means for estimating spheres in the volume image representation, means for propagating the estimated spheres constrained by image force constraints and narrow bands surrounding the spheres to yield propagated spheres, means for reinitializing and repropagating until the spheres converge.

In accordance with another aspect of the present invention, the imaging apparatus further comprises means for revising the volume image representation from the propagated spheres.

One advantage of the present invention resides in a robust system capable of handling variability in the input volumes, such as low signal to noise ratio, data corruption due to system noise, poor edge interface description and the like.

Another advantage of the present invention resides in the way the interface edges are given high scores, such as WM/GM interface and GM/CSF (Cerebral Spinal Fluid) interface. These edges help in building the convergence of the deformation process.

Another advantage of the present invention lies in the cleaning of the cavities between convoluted shapes, for example, between two sulci and two gyri, the cleaning is done using the morphologic system.

Another advantage of the present system lies in the design of the morphologic system using a combination of binary and gray scale morphological tools, logical operators and image algebra. Thus it is compact system adjusting the parameters automatically.

Another aspect of the present invention resides in creating a pipeline link for histogramming the gray scale images based on moments, applying the binary morphology and then using thinning operators for preserving the convoluted edges of the twisted shapes.

Another advantage of the present invention resides in the way that the constraints are applied in the level set framework for the deformation process to extract the embedded medical or non-medical shapes.

Another advantage of the present invention resides in the dynamic process of shape deformation based on image forces, which are computed dynamically.

Another advantage of the present invention resides in control of the speed function which is based on the likelihood model of the gray scale image smoothed and edge-preserved volume.

Another advantage of the present invention resides in control of the speed function automatically by checking the distances between the multiple deforming shapes.

Another advantage of the present invention resides in control of the speed function by mapping the gray scale likelihood function and controlled by the constrained distance between the propagating surfaces.

Another advantage of the present invention resides in the very accurate capturing of the 3-D topology of a volume such as a brain using the morphing algorithm.

Another advantage of the present invention resides in the system's adaptability to various shapes within the imaged volume.

Yet another advantage of the present invention resides in accurate distance computations such as the improved shortest distance method (or polyline distance method) as opposed to a single shortest distance method.

Another advantage of the present invention is speed since the propagation of the 3-D surface takes place in the narrow band.

Another advantage of the present invention lies in the flexibility of changing the mathematical functions or decay functions which controls the speed of the convergence process.

Another advantage of the present invention lies in the estimation of the geometrical features and quantification of segmented shapes based on the differential geometry.

Still further advantages will become apparent to those of ordinary skill in the art upon reading and understanding the following detailed description.

BRIEF DESCRIPTION OF THE DRAWINGS

The invention may take form in various components and arrangements of components and in various steps and arrangements of steps. The figures are only for purposes of illustrating the preferred embodiments and are not to be construed as limiting the invention.

DETAILED DESCRIPTION OF THE PREFERRED EMBODIMENTS

Figure 1:
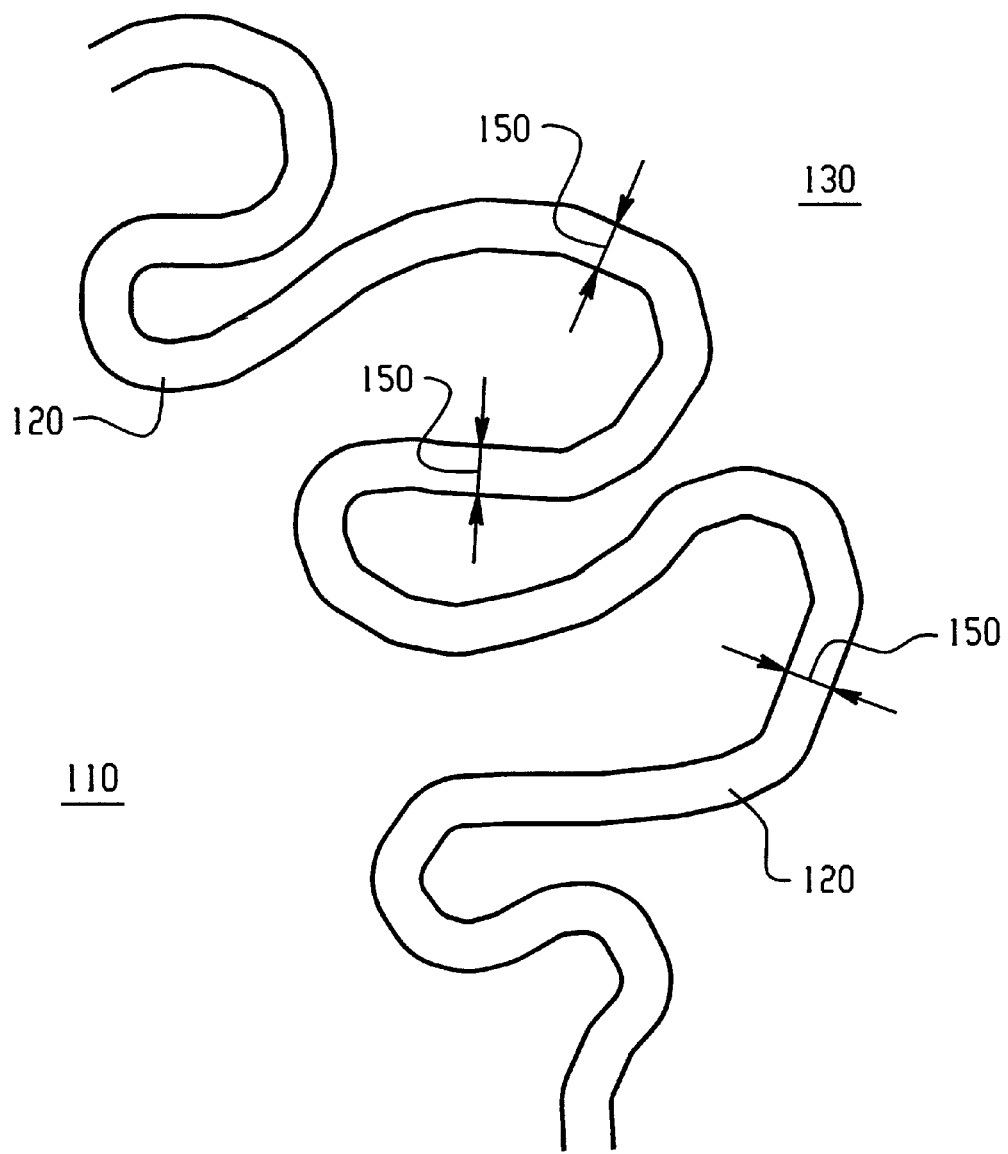
FIG. 1 is an illustration of a section of a convoluted 3-D surface.

With reference to FIG. 1, a volume of interest is comprised of several tissue types, for example, white matter (WM) 110, gray matter (GM) 120, and cerebral spinal fluid (CSF) 130. WM 110 and CSF 130 are separated by an area of GM 120 of assumed uniform thickness called the cortical thickness 150. Analysis has shown that employing a cortical thickness 150 between 3 mm and 5 mm results in satisfactory images. Indeed, a thickness of 3–4 mm typically produces optimal results.

The robust coupled surface idea (that is, the correspondence between edge enhanced surfaces of the WM 110 and GM 120) is motivated by the nearly constant thickness of the cortical mantle and thus uses this coupling as a image constraint during the morphing process. The algorithm starts with two or more embedded surfaces in the form of concentric sphere sets (more fully developed below) or concentric regular shapes. The inner and outer surfaces of these concentric shapes are then morphed, driven by their own attractive image-derived information from the edge-preserved volume, respectively, while maintaining the coupling in-between through the prior specified constraint in the form of the thickness 150.

Figure 2:
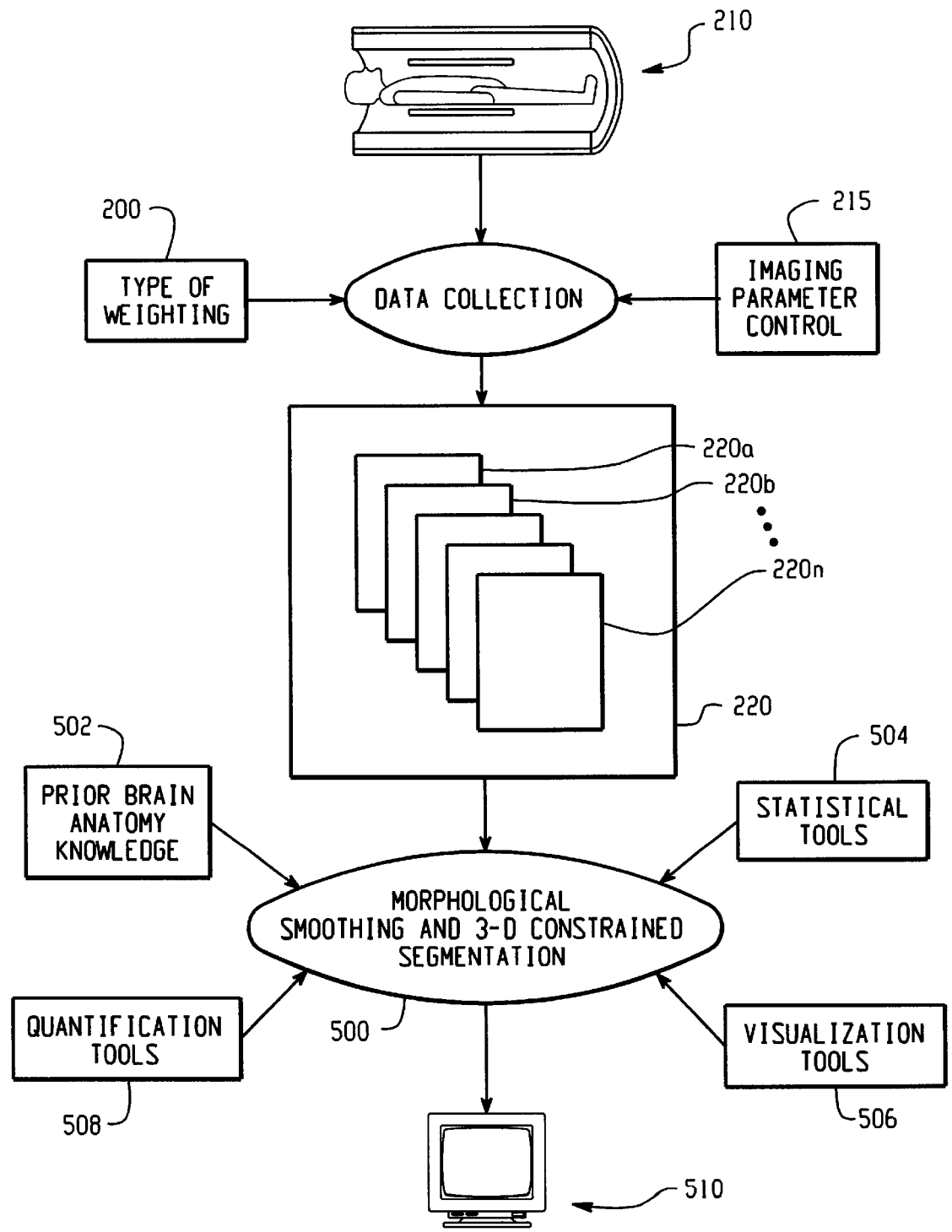
FIG. 2 is a system diagram of an apparatus according to the present invention.

With reference now to FIG. 2 an imaging system 200 includes a data collection unit 210 used to acquire image slice data over a volume of interest. Exemplary data collection units 210 include magnetic resonance systems, computed tomography devices and the like. In the case of a magnetic resonance system, the data collection unit collects the MR image volume based on the type of weighting and image parameters 215. For example, T1-weighted images may use the following parameters: Volume data collection using RF-FAST technique, TE=6.7 msecs, TR=14 msec, BW=31.3 kHz, FOV=25.6 cm, Flip angle=20, NSA=1, Thickness=1 mm, phase matrix=256, read matrix=256, number of slices=182, scan time=13.08 minutes. Accordingly, the data collection unit 210 at least somewhat controls the slice thickness and resolution of the pixels. The output of the data collection unit 210 is the imaged volume 220 captured as a series of 2-dimensional slices 220a, 220b, . . . 220n. The volume 220 is processed by an image processor 500 which receives inputs including prior knowledge or constraints 502, such as the cortical thickness 150 (FIG. 1). Other inputs include statistical tools 504, visualization tools 506 and quantification tools 508 which the processor 500 uses to manipulate and show the volume on a display unit 510.

Figure 3:
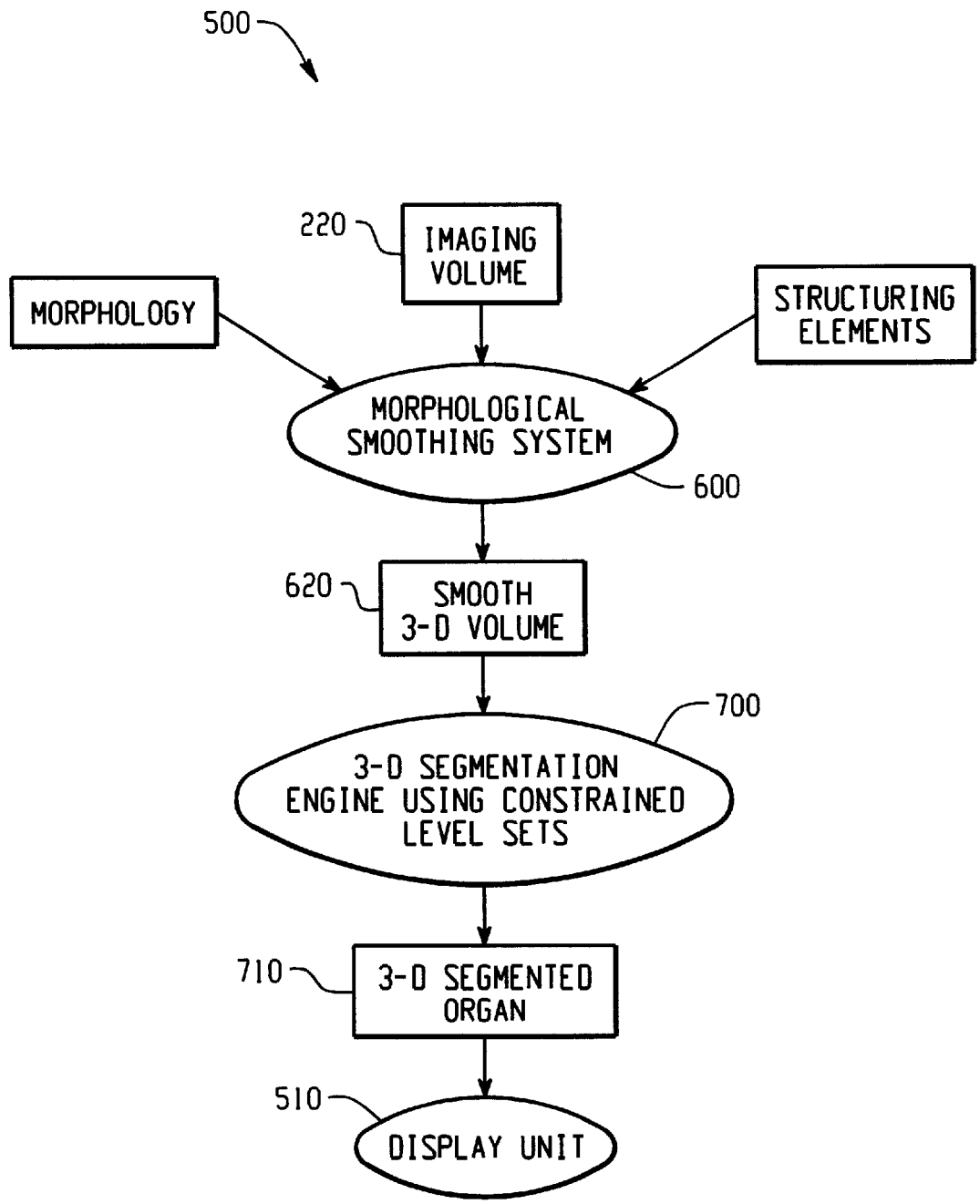
FIG. 3 is an object-process flow chart overview of a morphological smoothing and 3-D segmentation process.

With reference now to FIG. 3 the image processor 500 includes two major systems. The first is the morphological smoothing system 600 and the second is the 3-D segmentation processor 700 using constrained deformation system in level set framework. The morphological smoothing system and edge preservation 600 cleans and smoothes a 3-D surface from the plurality of 2-D image slices 220a, 220b, . . . 220n comprising the imaging volume 220. The morphological smoothing system 600 cleans and smoothes the surface as well as cavities yielding a smooth volume 620. This morphological smoothing system is based on gray scale morphology and a combination of logical operators and image algebra techniques that will be further developed below. Continuing with FIG. 3, the smoothed volume 620 is segmented in the 3-D segmentation processor 700 yielding a 3-D segmented volume 710 for display 510.

Figure 4:
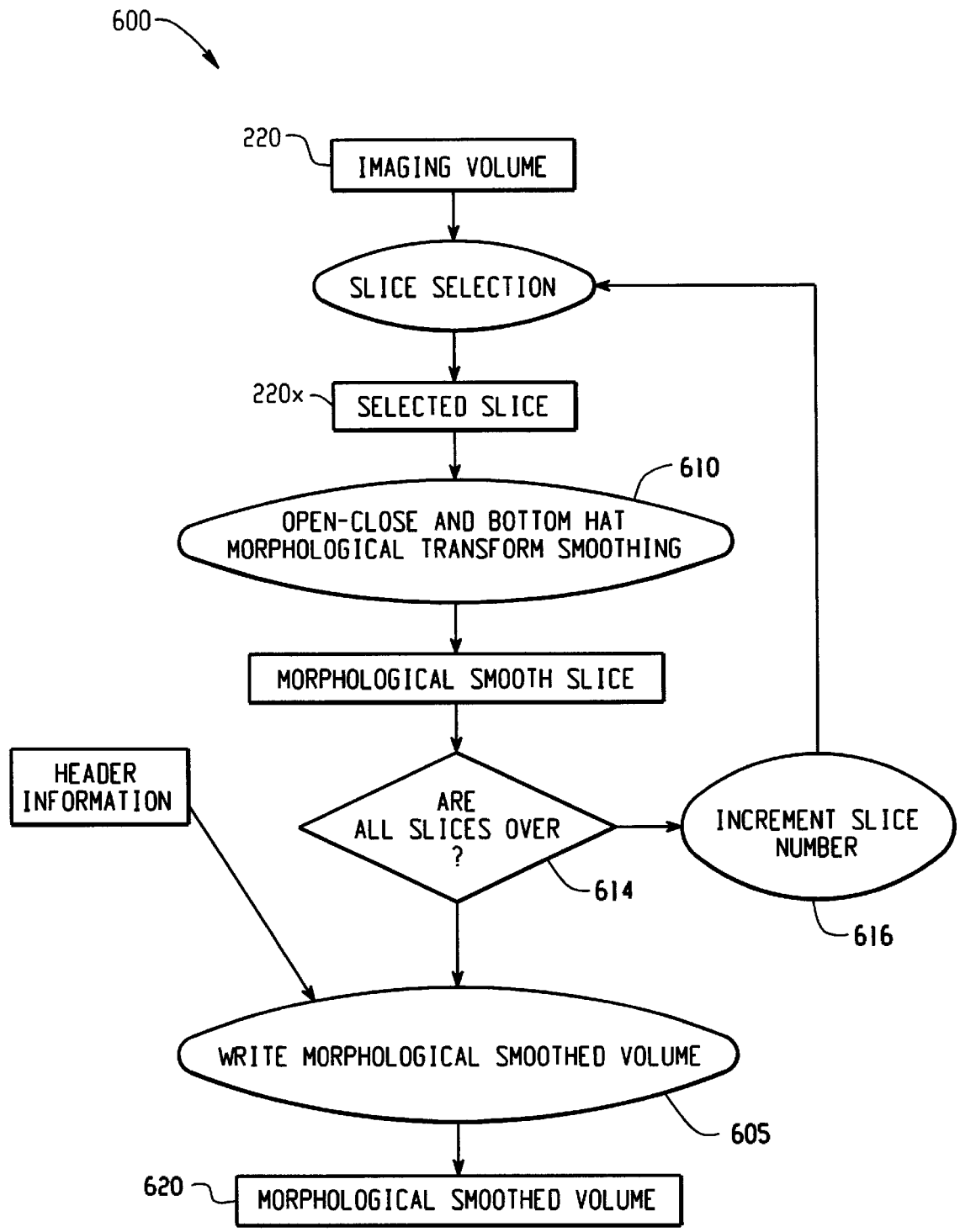
FIG. 4 is an object-process flow chart of the morphological smoothing system as seen in FIG. 3.

With reference now to FIG. 4, an exemplary morphological smoothing system 600 selects an image slice 220x. Open-close and Bottom-Hat morphological transform methods 610 are performed on the slice 220x. Mathematical morphology is used for noise reduction, edge preservation and volume enhancement. This method is based on four fundamental gray scale mathematical morphological operations called: Dilation, Erosion, Opening and Closing. Using these operations, the smoothed images slice by slice, are generated from a Bottom-Hat transform.

The strength of mathematical morphology in edge preservation and image denoising is tremendous. This is implemented using the convolution operation of the image with kernels. This kernel is also called a structuring element (SE) The structuring element can be of various shapes and sizes and depends upon the type of structure to be smoothed and segmented. An example of the SE would be a disk which is a 3×3 window in which all the pixels used except the corners. Another example is a square where the SE is a 3×3 window with all pixels are used. Usually the center of the SE is the center of the shape, but one can have the center of the SE any other pixel in the window. We will represent the SE as B and represent the original image as A.

Given a structuring element B and the original image A, one can mathematically define the four fundamental equations for morphological transform as:

The binary dilation is defined as:

$$A \oplus B = \{c | c = a+b, \text{ for every } a \in A, b \in B\} \quad (1)$$

The binary erosion is defined as:

$$A \ominus B = \{c | c+b \in A \text{ for every } b \in B\} \quad (2)$$

The binary closing is mathematically defined in terms of binary dilation and binary erosion as:

$$A \bullet B = (A \oplus B) \ominus B \quad (3)$$

The binary opening is mathematically defined in terms of binary dilation and binary erosion as:

$$A \circ B = (A \ominus B) \oplus B \quad (4)$$

The gray scale dilation is given as under:

Let "f" be the image signal and "g" be the structuring element. Then the gray scale dilation is defined as:

$$(f \oplus g)(x, y) = \max_{i,j}\{f(x-i, y-j) + g(i, j)\} \quad (5)$$

Gray scale dilation has a property to enlarge geometric structures in an image. To understand the gray scale dilation for medical images, we explain the Umbra and Top of a surface first.

Let $F \subseteq E^{N-1}$ f:F→E, then the Umbra of a function f, denoted by U[f], U[f]⊆F×E, then Umbra is mathematically defined as:

$$U[f] = \{(x,y) \in F \times E | y <= f(x)\} \quad (6)$$

and the Top of Surface is defined mathematically as:

$$T[A](x) = \max\{y | (x,y) \in A\} \quad (7)$$

where A is a set.

Thus the gray scale dilation using the Top and Umbra (as defined above) is given as:

$$f \oplus k = T\{U[f] \oplus U[k]\} \quad (8)$$

The gray scale erosion is defined as:

$$(f \ominus g)(x, y) = \min_{i,j}\{f(x+i, y+j) - g(i, j)\} \quad (9)$$

Gray scale erosion has a property to shrink geometric structures in an image, which is explained using the Top and Umbra as:

$$f \ominus k = T\{U[f] \ominus U[k]\} \quad (10)$$

In the same manner as the binary opening and binary closing, we present the gray scale opening and gray scale closing. The gray scale closing is mathematically defined in terms of gray scale dilation and gray scale erosion as:

$$A \bullet B = (A \oplus B) \ominus B \quad (11)$$

The gray scale opening of an image is mathematically defined in terms of gray scale erosion and gray scale dilation as:

$$A \circ B = (A \ominus B) \oplus B \quad (12)$$

These eight equations (1, 2, 3, 4, 5, 9, 11, 12) are the fundamental equation necessary for building edge preserving and image denoising. Another important operation is median filtering based on the gray scale opening and closing, and is mathematically defined as:

$$g(x) = \begin{cases} (f \circ k)(x) & \text{if } |(f \circ k)(x) - f(x)| >= |(f \cdot k)(x) - f(x)| \\ (f \cdot k)(x), & \text{otherwise.} \end{cases} \quad (13)$$

We also use the skeletonization (or thinning) of the set A by a structuring element K by sets $S_0, S_1, S_2 \ldots S_n$ and is given as:

$$SKEL(A, K) = \bigcup_{n=0}^{N} S_n \quad (14)$$

where $S_n$ is given as:

$$S_n = A \ominus_n K - (A \ominus_n K) \circ K \text{ and } A \ominus_0 K = A \quad (15)$$

Note that the subscript "n" is being used in the equation (15). This equation is the difference between the eroded image and the opening of the eroded image. The erosion is the recursive process.

Using the eight fundamental equations (a subset from equations 1 to 12, four binary and four gray scale dilation, erosion, opening and closing) along with the median (equation 13) and skeleton (equation 14) combined with image algebra produces a very powerful method for non-linear smoothing for medical images. This method is called the Bottom-Hat Gray scale morphological transform. There are three major features of such a system: (a) it removes the noise, (b) it cleans the cavities of the convoluted shapes and (c) it preserves the edges between the interfaces such as WM/GM and GM/CSF.

Continued reference to FIG. 4 illustrates an exemplary technique 614, 616 to repeat the process for all slices 220x before writing the smoothed image volume 620.

Figure 5:
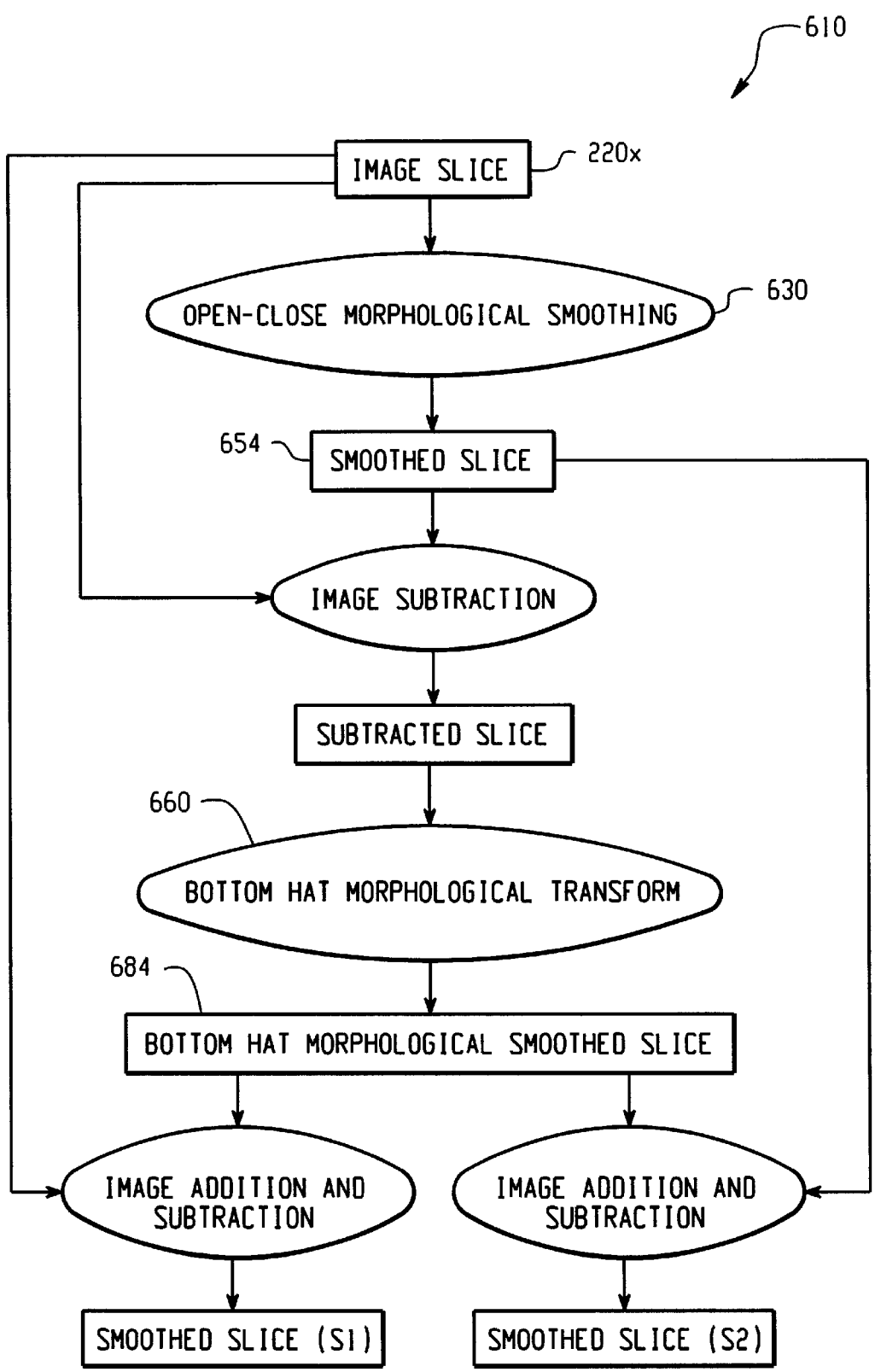
FIG. 5 is an object-process flow chart detailing a process from FIG. 4.

Referring now to FIG. 5, an exemplary open-close and Bottom hat morphological transformation method 610 first computes the open-close smoothing 630 of a slice followed by the Bottom-Hat morphological transform 660. The Bottom-Hat morphological transformed slice undergoes image algebra with respect to original slice (220x) to generate a smoothed slice S1 (see FIG. 5). The system also generates another set of smoothed slice S2 using the combination of Bottom-Hat Morphological transform slice and the smoothed slice obtained from open-close process (see FIG. 5).

Figure 6:
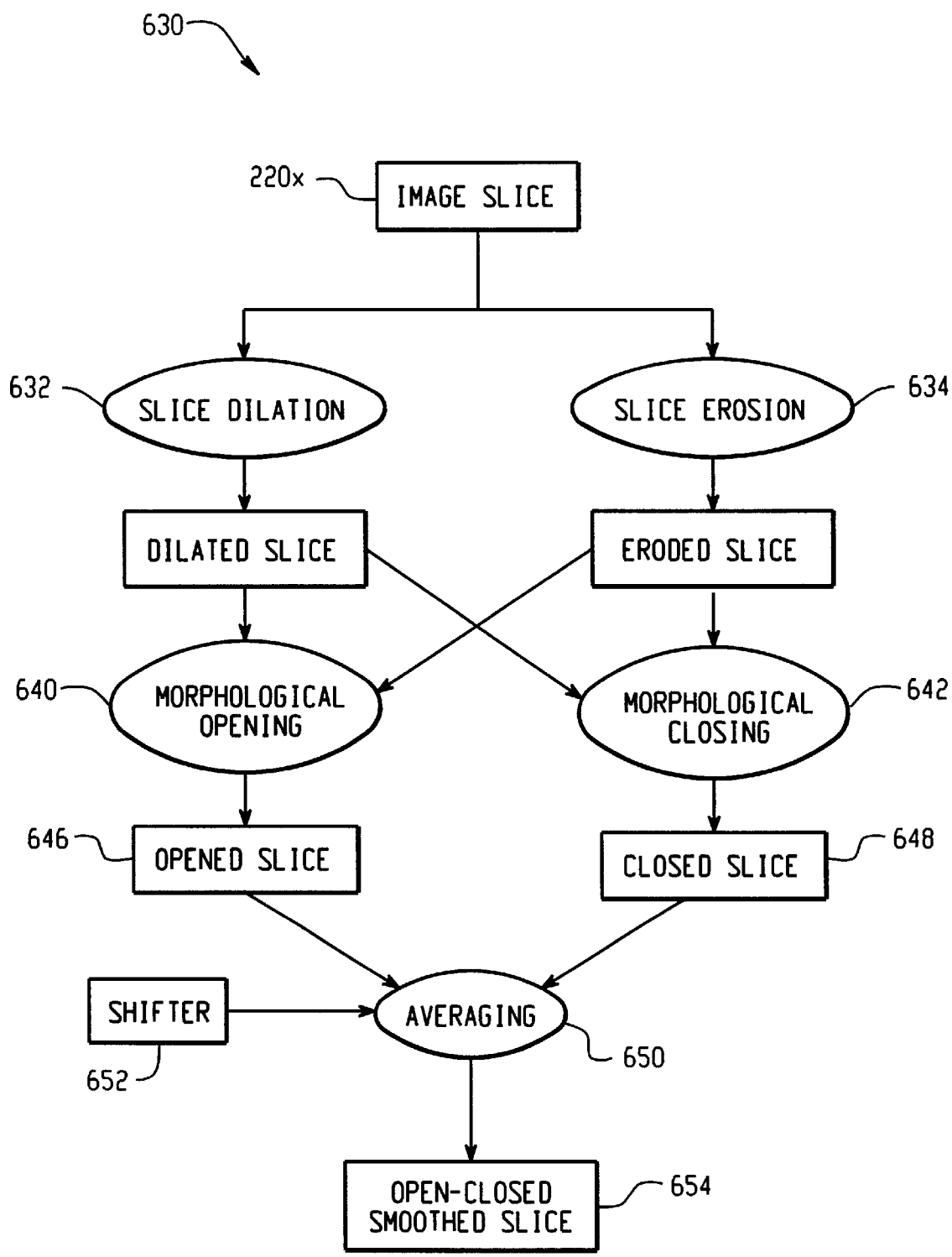
FIG. 6 is an object-process flow chart illustrating a process in FIG. 5.

More specifically, and with reference now to FIG. 6, the open-close morphological smoothing 630 proceeds by processing an image slice 220x in parallel paths. In the left column, the gray scale image slice 220x is dilated 632 by an image by a structuring element (SE). In the right column, the image slice 220x is eroded 634 by the SE. The output of these processes is passed to both opening 640 and closing 642 gray scale mathematical transforms to produce an opened slice 646 and closed slice 648. These are averaged 650 using a binary shift operation 652. If Iopen and Iclose are the two gray scale images, then the averaging operation is defined as: (Iopen+Iclose)>>1. In other words, if the binary values are right shifted by 1 then it is shrinking the gray scale intensities by half. An example is: Suppose the image intensities represent from 0 to 8 and they can be written in binary format as: 0000, 0001, 0010, 0011, 0100, 0101, 0110, 0111, 1000. On right shifting the $8^{th}$ integer that is from 1000 to 0100, which is equivalent to a integer value of 4, which is nothing but half of 8. Thus the right shifting brings averaging.

Figure 7:
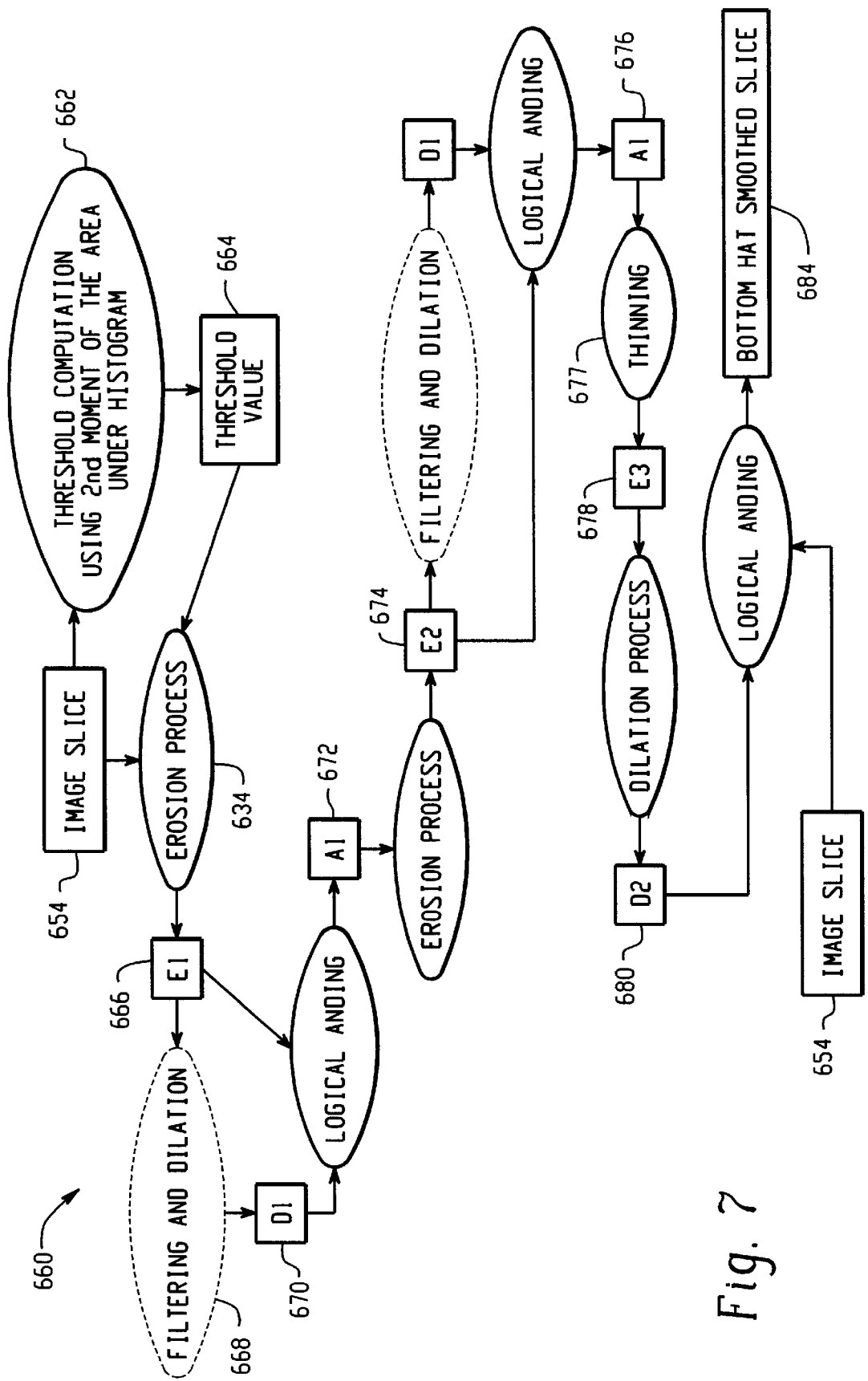
FIG. 7 is an object-process flow chart illustrating another process from FIG. 5.

Referring now to FIG. 7, the Bottom-Hat morphological smoothing process 660 uses a combination of Erosion, Dilation, Skeleton and Logical ANDing and ORing process. First, the smoothed gray scale slice 654 is changed to a binary image using a thresholding process 662. This process 662 first computes the histogram of the image and then the area under the histogram. The second moment of this area will compute the threshold value 664 of the given gray scale image. This threshold 664 is used with the morphological operation to estimate the Eroded image 666. Using the cleaning and dilation process 668, we get intermediate output 670. Now, the eroded image 666 and dilated image 668 are logically ANDed to generate the ANDed image 672. The ANDed image 672 is eroded with the structuring element (binary) to yield eroded image 674. Using the same combination of filtering, dilation and logical ANDing, we generate the image 676. The thinning procedure 677 on this image generates the image 678. This image 678 is dilated to yield image 680. This is logically ANDed with the smoothed open-close input image 654 to produce the smoothed Bottom-Hat Smoothed Slice 684. This entire process is repeated for all the slices to generate the smoothed image volume 620 (FIG. 4). Note there are two key advantages of this technique: first, it cleans the image and removes the noise; and second, it opens the cavities between two sulci, which is the key in 3-D segmentation.

Figure 8:
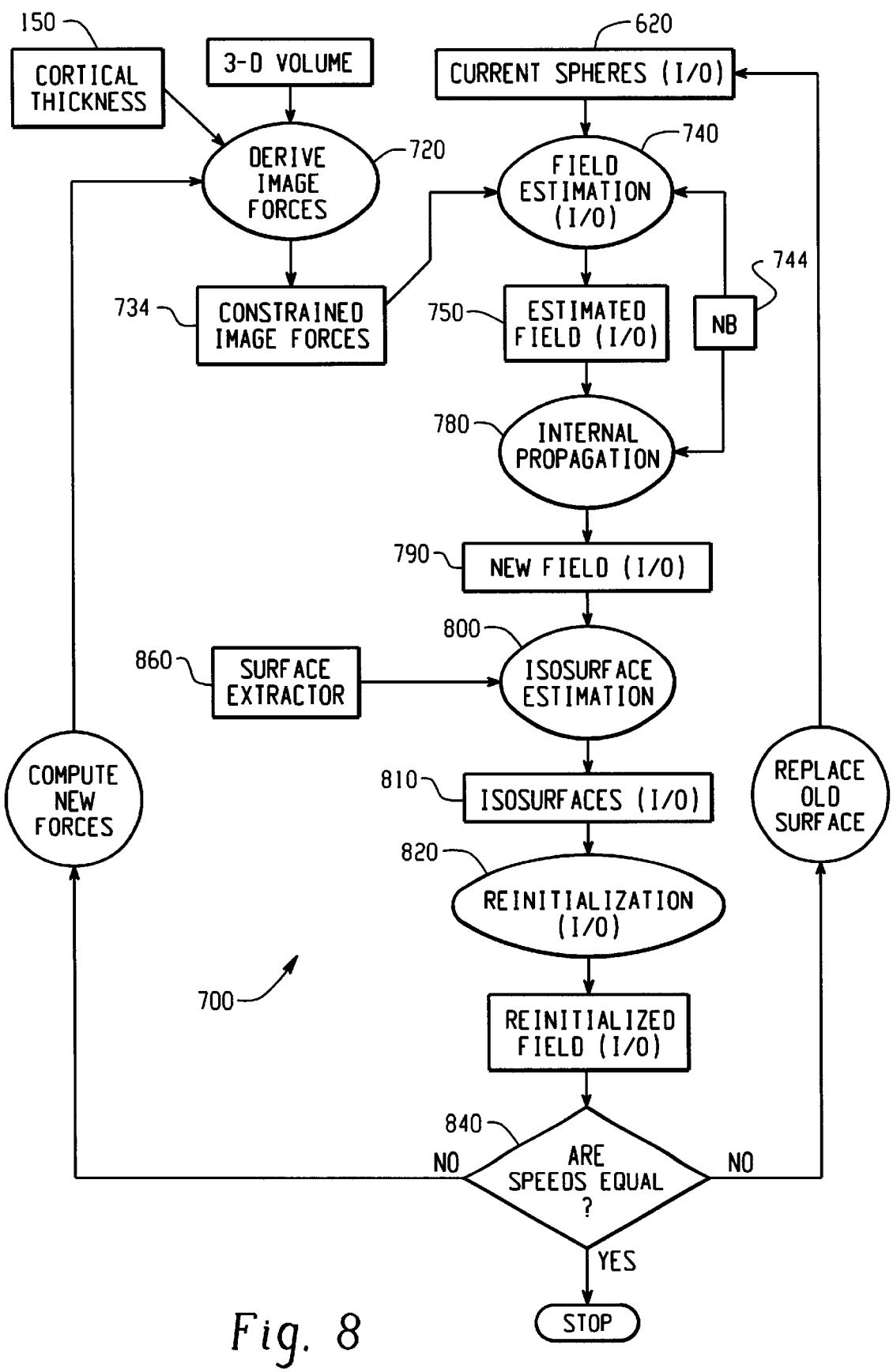
FIG. 8 is an object-process flow chart of a 3-D segmentation process as seen in FIG. 3.

With reference now to FIG. 8, the 3-D segmentation system 700 (see also, FIG. 3) using constrained morphing starts with the smoothed and edge preserved 3-D volume 620. The exemplary, illustrated system 700 consists of five principal steps which are: (i) Derivation of the constrained morphing forces 720; (ii) Field estimation 740; (iii) Internal 3-D morphing or propagation 780; (iv) Isosurface extraction and estimation 800; and (v) Reinitialization 820. Each of these steps are considered below.

Derivation of the constrained morphing forces 720 is based on a likelihood generation using a Gaussian Distribution model (also called CLAMPER or regularizer because this helps in clamping for the morphing process). Initial field estimation 740 uses a signed distance transform on the surface in the narrow band (NB). Internal 3-D morphing 780 completes the morphing of initial field estimate by picking up constrained forces derived from the constrained morphing forces 720. Isosurface extraction 800 extracts the same density surface from the given volume. Exemplary algorithms are based on triangularization or polygonalization of the volume. This extraction can also be displayed by computing the shading on the surface based on a computer graphics technique. We will discuss these steps in greater detail below.

Figure 9:
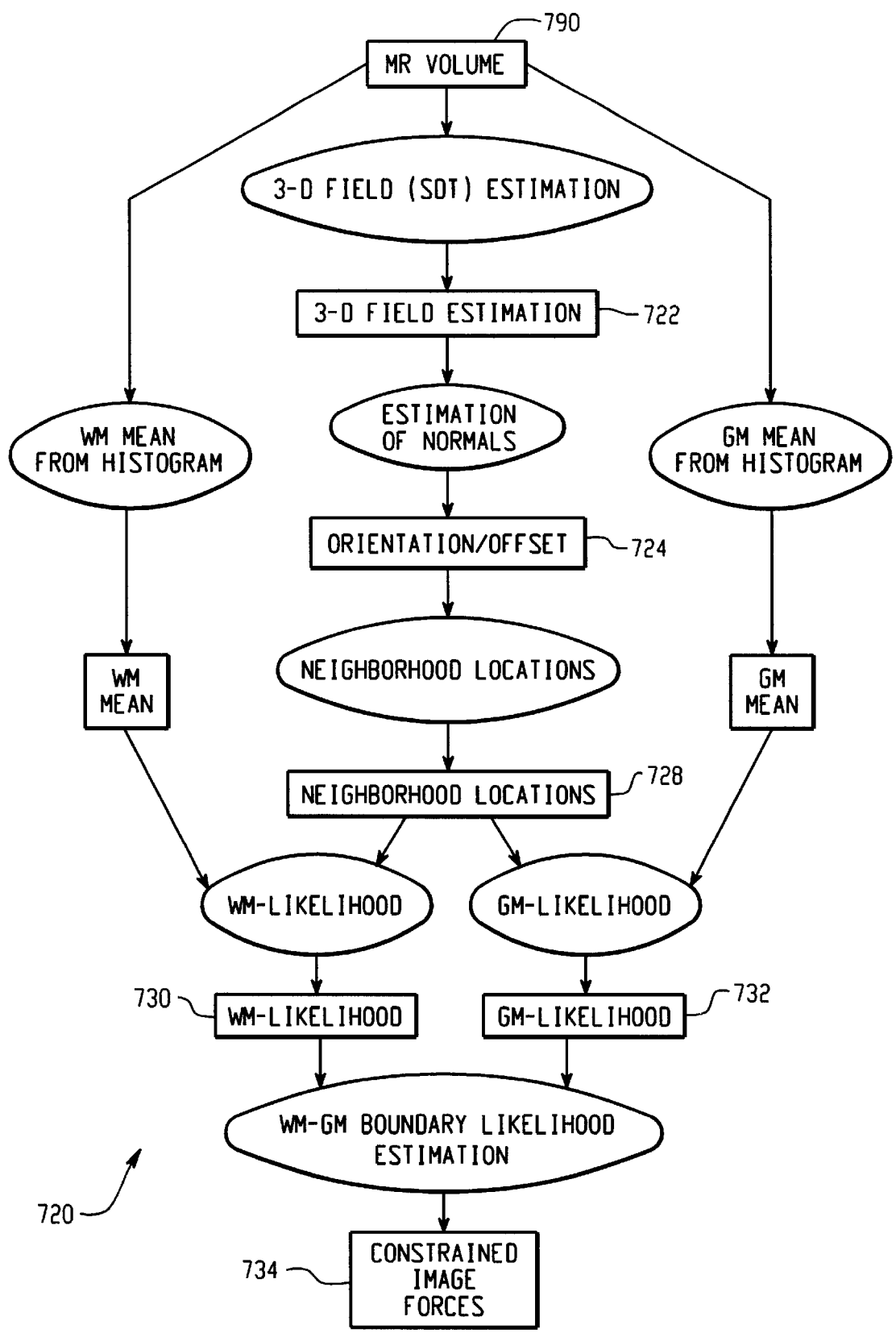
FIG. 9 is an object-process flow chart of a process as seen in FIG. 8.

Referring now to FIG. 9, an exemplary algorithm for design of the regularizer or clamper. This means deriving the image forces 720 using differential geometry is based on a likelihood generation using a Gaussian Distribution model (called CLAMPER). While the WM-GM likelihood image is illustrated, those skilled in the art will appreciate that the same principle is applied for the GM-CSF likelihood image computation or that of another interface. The forces derived are the image forces which are also used for capturing topology information to the morphing process. They are also called as navigating forces which steers the morphing process based on the gray scale distribution of the intensities in the volume. Since the gray scale information is available, one of the best strategies would be to use the likelihood operator.

The image-derived information is obtained by using a local likelihood operator based on gray-level information, which gives the algorithm the ability of capturing the homogeneity of the tissue inside the volumetric layer. From the morphological smoothed and edge preserved volume 620, a 3-D field 722 is estimated (Signed Distance Transform) given the initial spheres 620a, 620b. This field is the distance measure. From the initial field distribution 722, the normals and offsets 724 are computed at every voxel location using differential geometry. These two offsets along with the neighboring voxels 728 are used in two (WM-GM and GM-CSF) different distributions to compute the likelihood values. For the first distribution (here, WM), the WM likelihood probability 730 is computed given a voxel and similarly, the GM likelihood probability 732 is computed given the second distribution (here, GM). From the WM probability 730 and the GM probability 732 the WM-GM likelihood image 734 is computed. Mathematically, they can be expressed as:

$$p_{WM-GM} = \prod_{s \in G} \frac{1}{\sqrt{2\pi\sigma_G}} e\left\{\frac{(I_g - \mu_G)2}{2\sigma_G}\right\} \cdot \prod_{w \in W} \frac{1}{\sqrt{2\pi\sigma_W}} e\left\{\frac{(I_w - \mu_W)2}{2\sigma_W}\right\} \quad (16)$$

where e stands for the exponential, W and G are the WM and GM regions, $\mu_W$ and $\mu_G$ are the mean values of the WM and GM, respectively. $\sigma_W$ and $\sigma_G$ are the standard deviations of the WM and GM regions. $I_w$ and $I_g$ are the WM and GM pixel intensities. Note, the output 734 of the WM-GM likelihood functions 730, 732 is the images which have edge information or clamping forces about the surface of WM-GM. Similarly, the WM-CSF likelihood function (not shown) is an image which has WM-CSF edge or gradient information. Note that those skilled in the art of image processing can appreciate that other regularizers and distributions could also be used for computing the likelihood.

Figure 10:
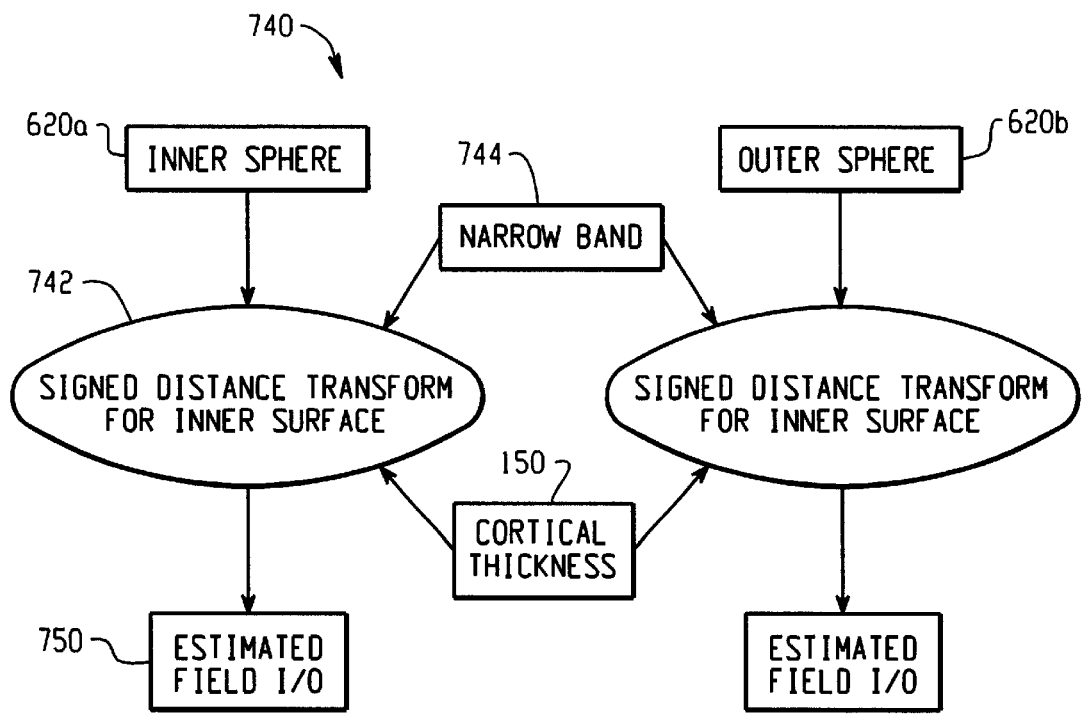
FIG. 10 is an object-process flow chart of another process as seen in FIG. 8.

Referring now to FIG. 10, a first estimate for the initial 3-D field 750 is made given the concentric initial spheres 620a, 620b. This initial field computation process is preferably done in parallel for both the inner 620a and outer 620b shapes as illustrated. Detailing only one of the parallel paths, those skilled in the art will be able to extend the teaching to the other path. Thus, starting with the inner volume or sphere 620a, a signed distance transform 742 is performed constrained in the narrow band 744 and by the cortical thickness 150 (FIG. 1), yielding estimated field 750.

Figure 11:
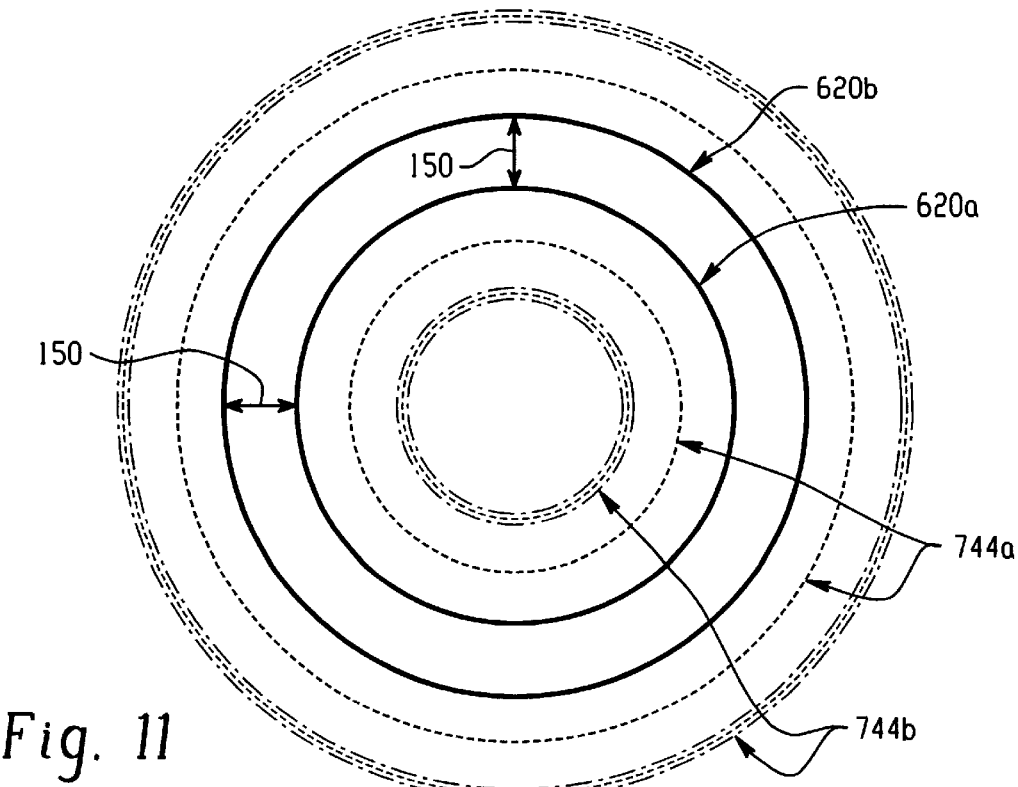
FIG. 11 is a stylized representation of the cortical constraints between inner and outer spheres as used in the morphing system.

With reference now to FIG. 11, the narrow banding 744 is graphically illustrated as surrounding the inner 620a and outer 620b spheres. Bands 744a around the inner sphere 620a define the narrow band in which the 3-D field is computed. Similarly, bands 744b around the outer sphere 620b define the narrow band for the outermost sphere. Noteworthy is that the respective narrow bands 744a, 744b contain both the inner and outer spheres 620a, 620b.

Figure 12:
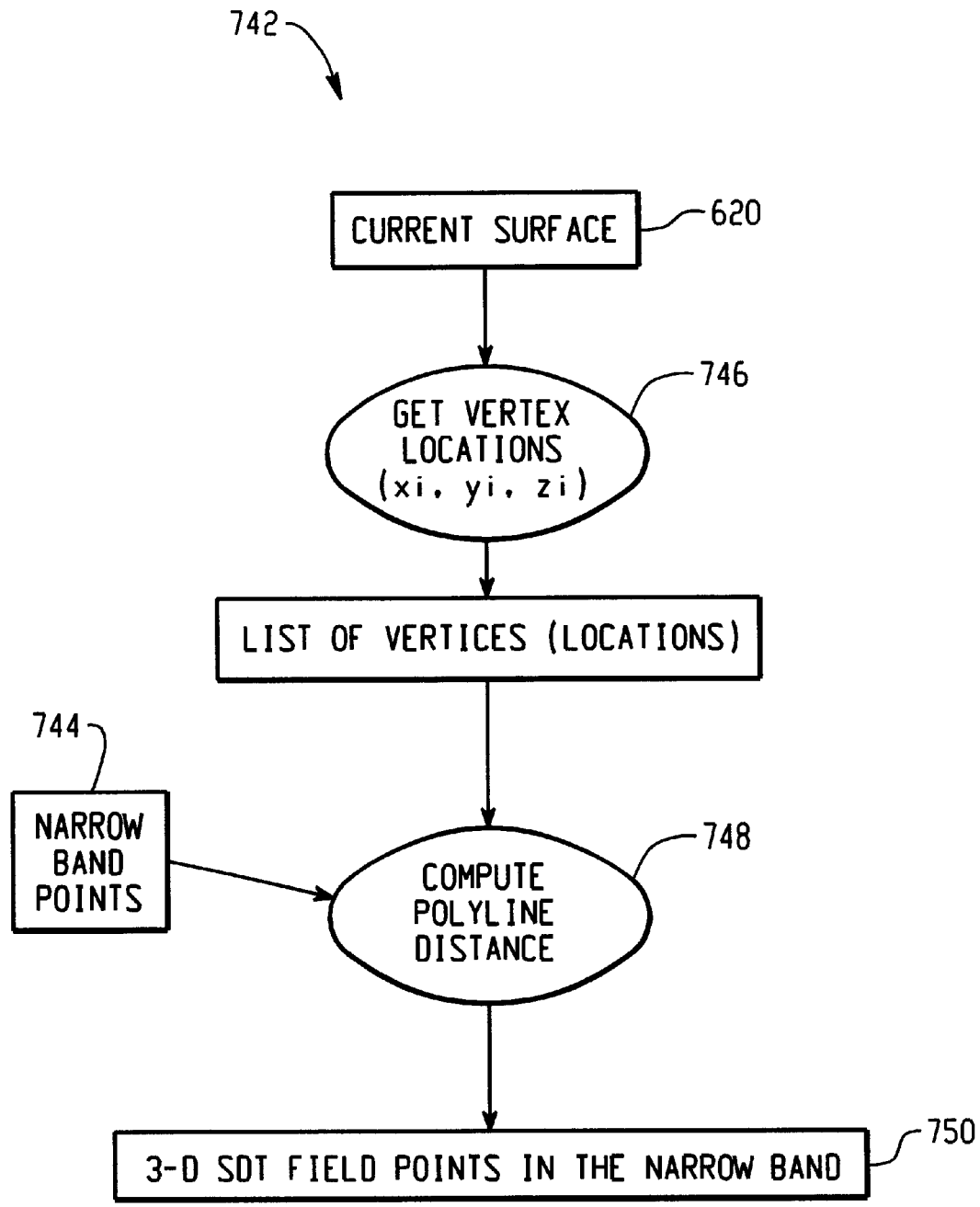
FIG. 12 is an object-process flow chart of a 3-D signed distance transform.

With reference now to FIG. 12, the computation of the initial field using the polyline distance scheme is illustrated as an exemplary method to accomplish the signed distance transform 742 (FIG. 10) for the inner and outer surfaces 620. This is a very accurate method of computing the perpendicular distance between the point and the opposite segment. Generally, the goal is to find the shortest distance 748 from the given vertex to neighboring vertices 746. If the neighboring vertices are kept in an ordered list, this computes the distance between the given vertex and the vertices in the list. It is not necessary that the shortest distance 748 is the distance is the distance between the given vertex and the "vertices" in the list. One could find the shortest distance between the given vertex and the "polyline joining the vertices" in the list. This polyline is the line segment which joins any pair of two vertices in the list in an order. Thus the shortest distance 748 (also called polyline distance here) is the shortest distance between the given vertex and the opposite pairs of line segments if the segment lies in the range of the given vertex. Otherwise, it is one of the shortest distances from a given vertex to one of the vertices in the list. Suitable methods such as vector calculus are used to find if the given vertex lies in the range of the polyline. If the given vertex is in the range of the polyline, then the perpendicular is dropped from the given vertex to the ranged polyline and the point of intersection between the perpendicular and the polyline is found. The distance between the given vertex and the intersection point is the improved shortest distance measure or polyline distance measure. Since one uses the vector calculus based method to estimate the range and the intersection point, this method directly gives the distance measure, which is major advantage of this technique besides being a very stable technique.

Figure 13:
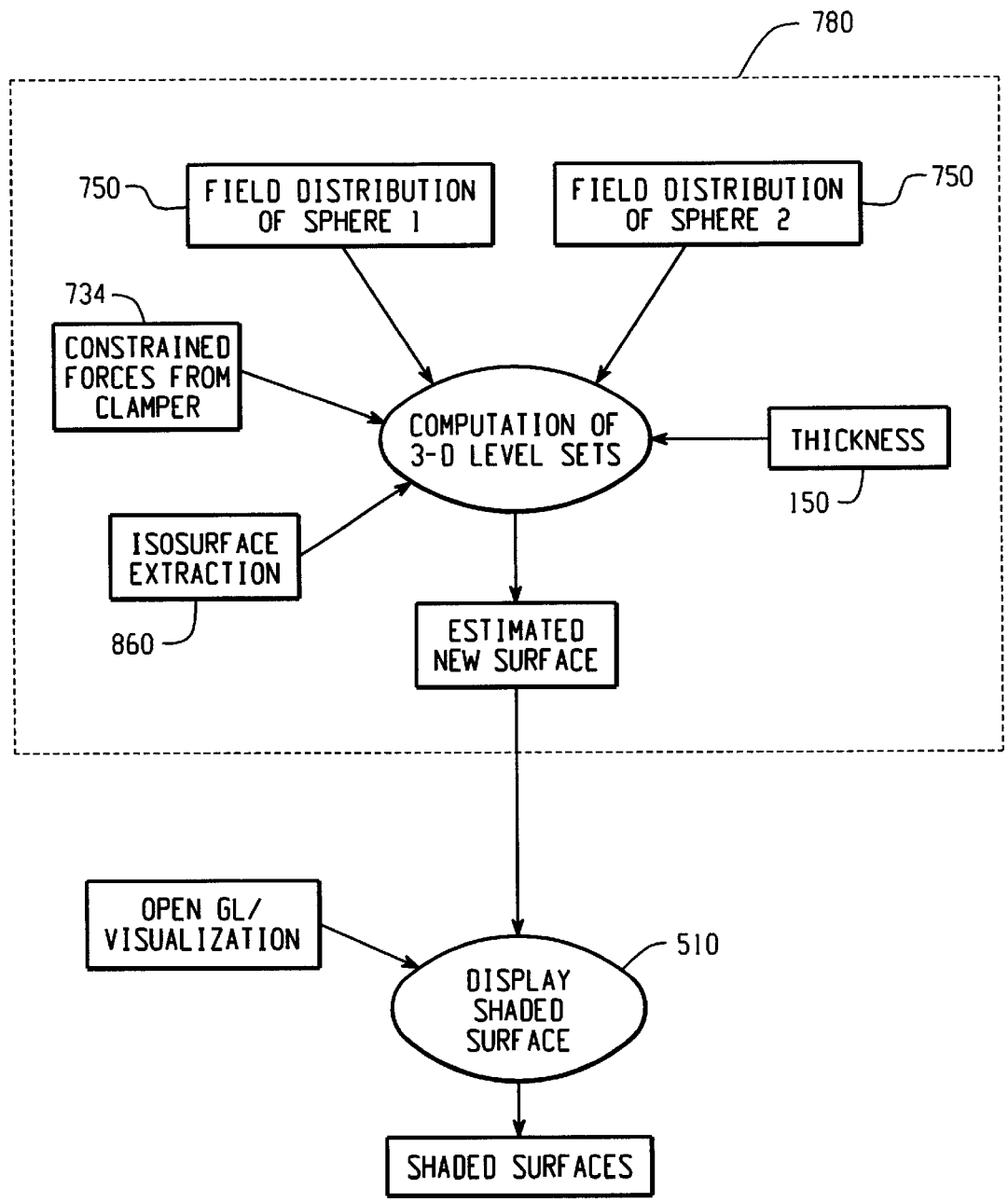
FIG. 13 is an object-process flow chart of a process from FIG. 8.

Now referring to FIG. 13, an exemplary embodiment of the internal propagation step 780 (FIG. 8) shows the computation of the morphed surface given the initial sphere fields 620a and 620b (see FIG. 10). The internal propagation is used to solve the partial differential equations corresponding to the two or more embedded spheres in the narrow band. One of the methods for morphing could be using the level set framework, a powerful numerical scheme for computing interface motion (see Osher and Sethian, Fronts propagating with curvature dependent speed: algorithms based on Hamilton-Jacobi formulations, Journal of Computational Physics, Vol. 79, No. 1, pp. 12–49, 1988). Instead of evolving the two surfaces directly, two level functions whose zero level set corresponding to the cortical bounding surfaces were calculated. The equations of the morphing surfaces are given as:

$$\Psi_{in}(x,y,z,t)=CF_{in}(x,y,z)|\nabla\Psi_{in}(x,y,z,t)|$$

$$\Psi_{out}(x,y,z,t)=CF_{out}(x,y,z)|\nabla\Psi_{out}(x,y,z,t)| \quad (17)$$

where $CF_{in}$ (x,y,z) and $CF_{out}$ (x,y,z) are the inner and outer constrained coupled speed functions which are computed from the image derived forces from step one. Note that the speed is totally controlled by the image-derived constrained forces, which is a function of the smoothed and edge-preserved input volumes. Those in the field of image processing will appreciate the power of the image-derived speed functions which have stronger information about the interfaces (e.g. WM/GM and GM/CSF). The combination of morphological processing, image algebra and logical operators provides an improved speed function, not just plain gray scale speed functions. Since the likelihood is computed on the edge perserved and smoothed volume, the speed function is able to be better controlled. The speed function should be ideally zero if the likelihood computation is 1. This means the interface has been detected. If the likelihood function is not close to 1, but instead varies between 0 and 1, then the speed function also varies between the high and low limits. This variation of speed function are constrained by the distance (150 FIG. 1) between the outer and inner surfaces, which is the prior information. If the distance is out of range, say larger than the cortical thickness, then the speed function is affected or penalized. In other words, the speed function is checked by the prior knowledge of the embedded thickness of cortex and the edge preserved smoothed volume. As discussed above, if the distance is out of range, the speed needs to be checked by the checking function which is a slow moving polynomial such as exponential or Hermitite polynomial. Those in the field of statistical analysis can appreciate that there are other mathematical functions and penalize the speed-likelihood mapping function to control speed so that the morphing process can behave in the normal limits. A rapid fall in speed-likelihood mapping function will help the convergence process faster and similarly if the morphological edge preservation is stronger, the convergence is faster.

To accomplish the internal propagation or settling surface, the speed control function is multiplied to the gradient of the signed distance function. This is the Eulerian representation of the curve evolution theory or flame propagation theory. Thus, the gradient information is computed using the nabla or gradient operator given as:

$$\Psi_{in}\ (x,y,z,t)\ \text{and}\ \nabla\Psi_{out}\ (x,y,z,t)$$

The partial differential equations are solved in a narrow band using the fast marching method. The coupling between the two surfaces was realized through the propagation speed terms CFout and CFin, while the distance between the two surfaces is within the normal range, the inner and outer cortical surfaces propagate according to their own image features. When the distance starts to fall out of the normal range, the propagation slows down and finally stops when the distance is outside the normal range, or the image feature is strong enough. A coupled narrow band algorithm was customized for the coupled-surfaces propagation. The correspondence between points on the two bounding surfaces falls out automatically during the narrow band rebuilding, which is required for surface propagation at each iteration. This shortest distance-based correspondence is essential in imposing the coupling between the two bounding surfaces through the thickness constraint.

Figure 14:
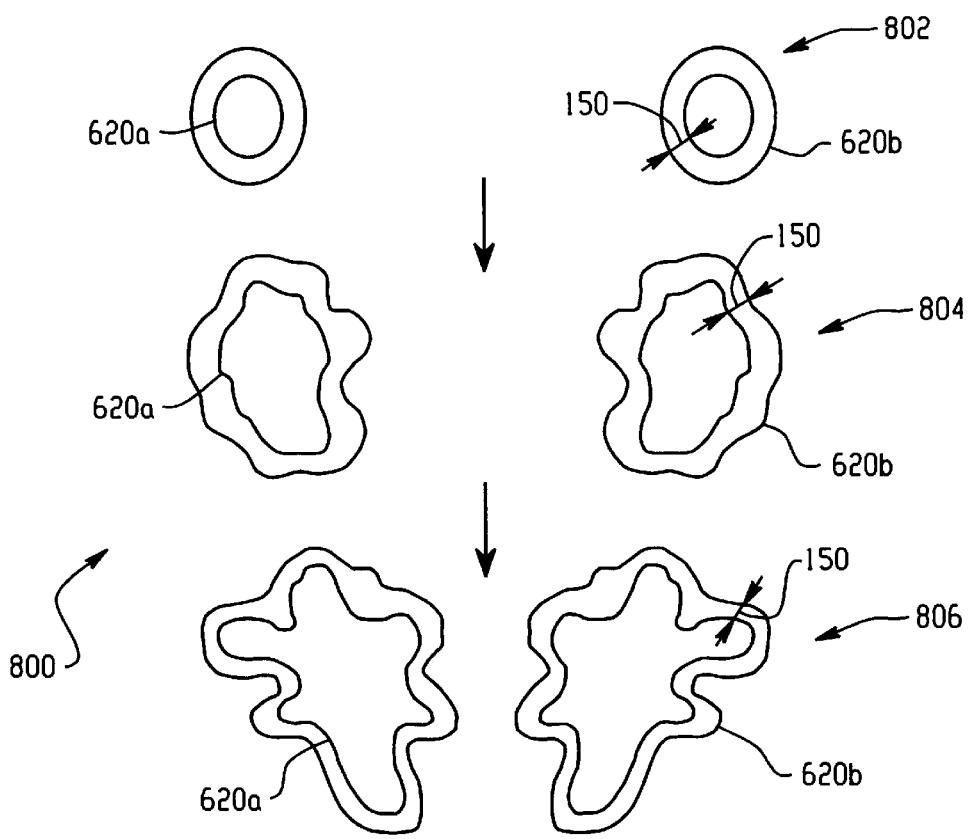
FIG. 14 is a graphical progression showing the 3-D morphing process according to the present invention.

Referring now to FIG. 14, a three stage progression of the morphing process 800 (FIG. 8) is illustrated. Stage one 802 shows a set of concentric initial shapes 620. Typically these are user chosen shapes, which can, for example include two concentric spheres on one half of the brain and two concentric spheres on the other half of the brain (as illustrated). Stage two 804 shows the morphing of the initial shapes closer to the shapes of the brain topology, keeping the constraints in the picture. This deformation uses the edge preserved interfaces from the morphologic smoothing system to speed up the convergence along with the image derived information gathered from the likelihood function from the morphologic smoothed volume. The constrained deformation from stage one to stage two means morphing the initialized shape towards the topological shape. Finally, in step three 806 the goal shapes are identified as the speed falls close to zero at the interfaces. Due to the property of level sets, the morphing process has the ability to spilt and merge by itself, which provides yet another advantage to the morphing system.

Figure 15:
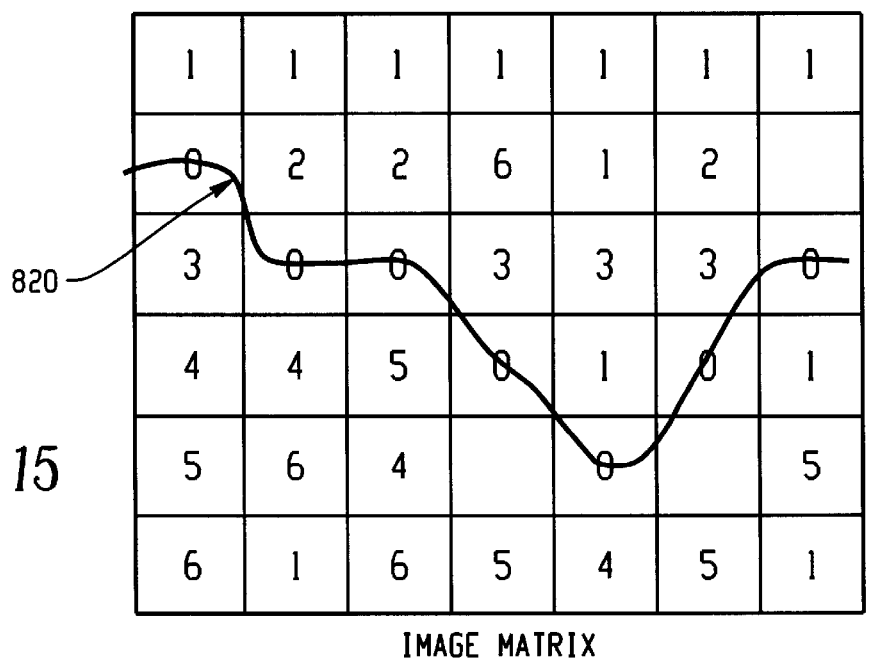
FIG. 15 is an image matrix illustrating an isocontour.

With attention now to FIG. 15, a 2-D graphical example of a contour extraction during the morphing process will illustrate the topological 3-D process. This figure shows how the isocontour 820 is extracted from a given image. An isocontour is a contour that has the same intensity value in the image. As seen in this figure, a "zero level" isocontour 820 is seen in the image. Similarly in 3-D, an isosurface is generated. Since we are dealing with volumes, the polygonization is computed from the volume directly. The polygonalization process is constructed using the triangulation scheme in the spirit of the marching cube (MC) technique (see Lorensen et al. Marching Cubes: A high resolution 3-D surface construction algorithm, ACM Computer Graphics, Proceedings of Siggraph, Vol. 21, No. 4, pp.

163–169, July 1987). The edge table generation and normal computation using finite difference offers an added simplicity and robustness to the system. The basic principle of the MC algorithm was to subdivide the 3-D scalar field values into a series of small cubes. The algorithm then marches through each of the cubes testing the cube corners and replacing the cube with a set of polygons. The total sum of all the polygons constitutes the surface (or isosurface) which is an approximation to the 3-D data or 3-D field values. For a 3-D volume, each cube has 8 corners which leads to 256 (2 power of 8) possible combinations of corners. To simplify the MC algorithm, others have reduced the complexity by taking into account cell combinations that duplicate under the following conditions: (1) Rotational invariance along any of the three primary axes (by any degree); (2) Mirror image of the shape across any of the three primary axes; or (3) Inversion of all the corner states and flipping the normals of the relating polygons.

By taking these conditions, one can reduce the 256 combinations down to 15 combinations. Thus, given the volume, the first step is the edge table generation, which results in the triangulation. The edge table consists of finding out which cells or voxels are cut out by the morphing surface. The edges of the cubes which get cut by the surface are noted. The cut points constitute the polygons and all the polygons constitute the polygonalization process.

Figure 16:
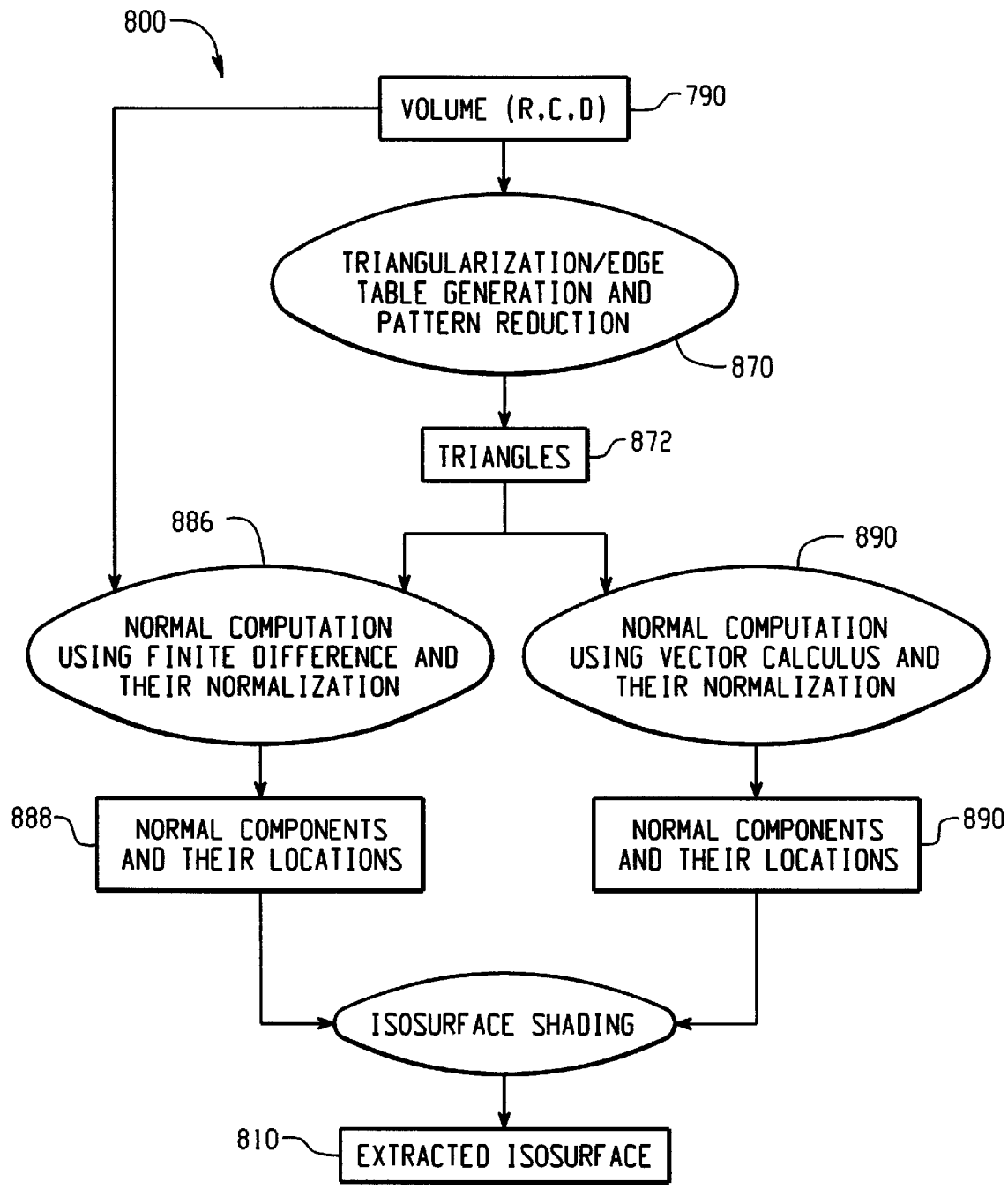
FIG. 16 is an object-process flow chart to extract an isosurface during the morphing procedure.

With respect now to FIG. 16, an isosurface extraction algorithm 800 is illustrated which starts with a volume 790 which is the new estimated field flow (see FIG. 8). This new field is the field morphed from the initial field acted by the image derived forces controlled by the edge-preserved volume and likelihood measure. The isosurface generation consists of two steps. First is the triangularization or polygonalization of the input volume 870 yielding a corresponding shape 872. Step two computes normal components and locations by two paths: the finite difference method 886 and the vector calculus method 890. The finite difference method 886 computes the difference of densities (gradients) at each vertex (3 components) and normalized normals are computed by normalizing the gradients. In the vector calculus method 890, the normalization is computed by dividing the normals by the square root of the square of the three components. The normals and the vertices are used for isosurface generation. These shapes 872 represent the isosurface which can also be shaded.

Figure 17:
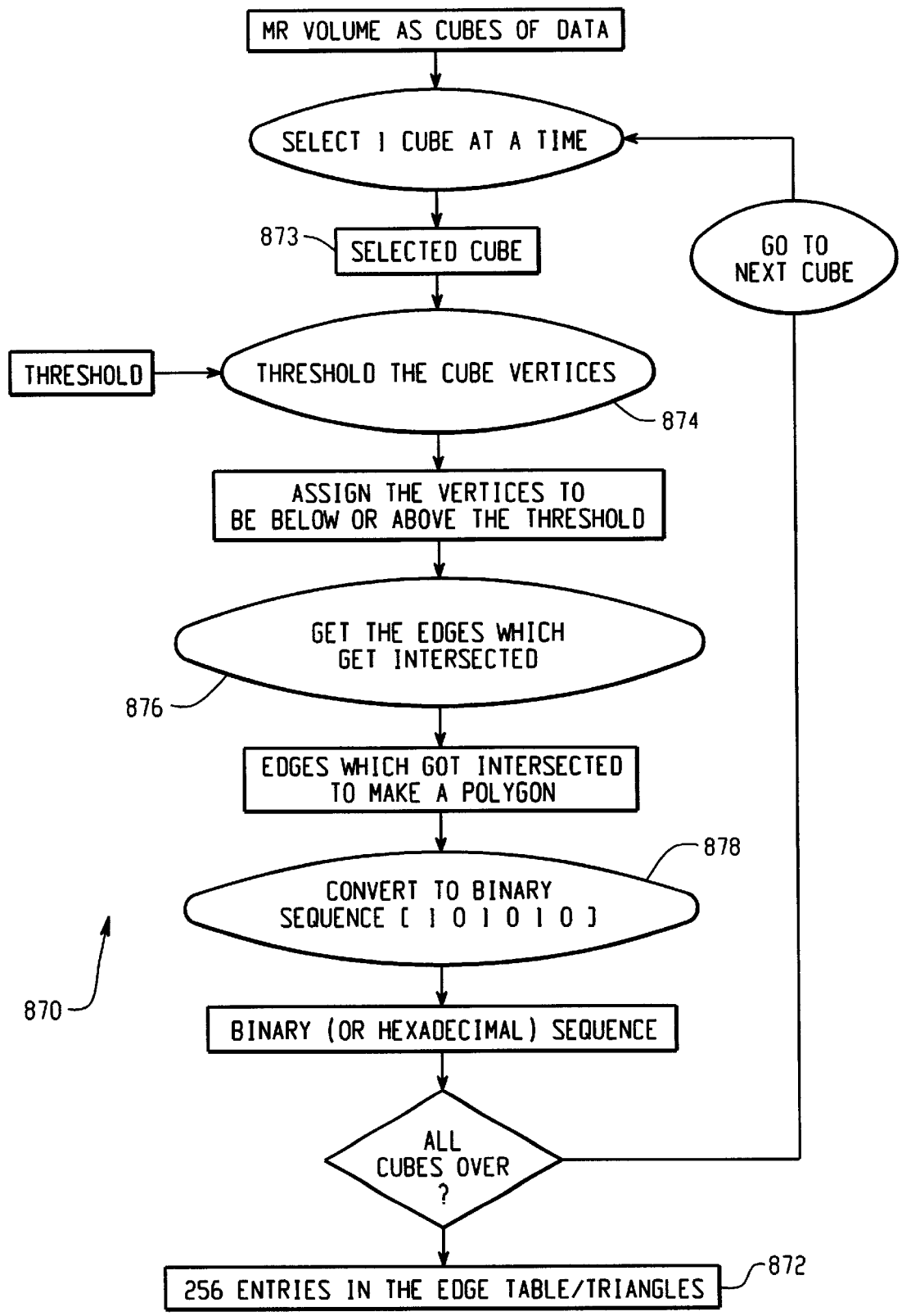
FIG. 17 is an object-process flow chart of a process of FIG. 16.

Referring now to FIG. 17, the shape conversion 870 (i.e. triangularization or polygonalization) of the input volume includes selecting a cube or shape 873, and applying a threshold 874 to vertices of the shape. Intersected edges are obtained 876 from the thresholded vertices, which are then converted to a binary sequence 878. When all the cubes are completed, a table is fully populated with edge information 872.

Figure 18:
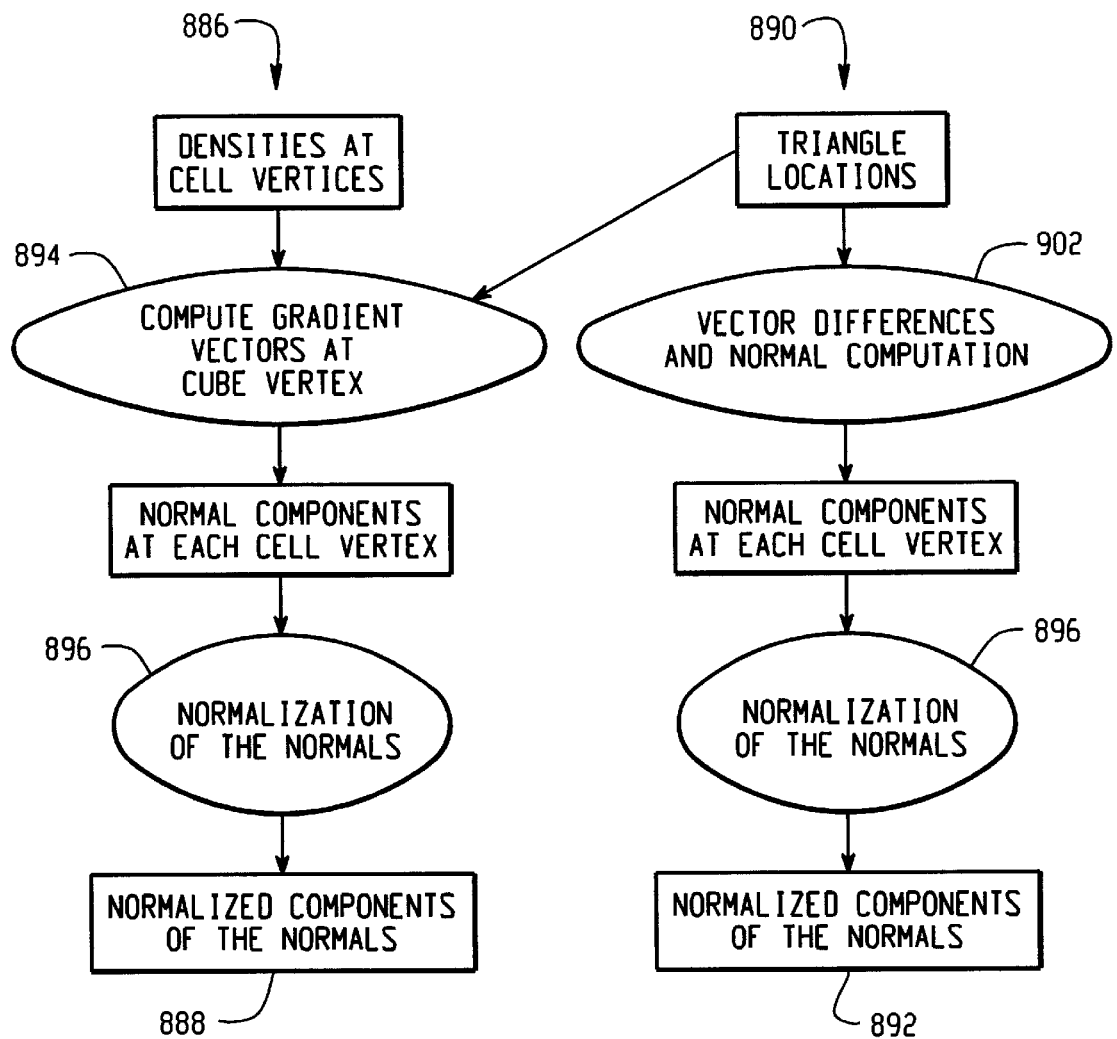
FIG. 18 is an object-process flow chart of other processes in FIG. 16.

FIG. 18 illustrates the normalization and shading process 886, 890. In the first way 886, the gradients are computed 894 from the voxel densities at each cube vertex. These are the normal components at each vertex. The normalization of these normals 896 is determined by dividing these gradient values by the square root of the sum of the squares of the three components. In the second way 890, we compute the vector difference method to compute the normal components 902. These normal components are then normalized 896 in a similar way as was done in the first method, where the normals are divided by the square root of the sum of the squares of the three components. The shading of these intermediate surfaces is done using the pipeline discussed below.

Figure 19:
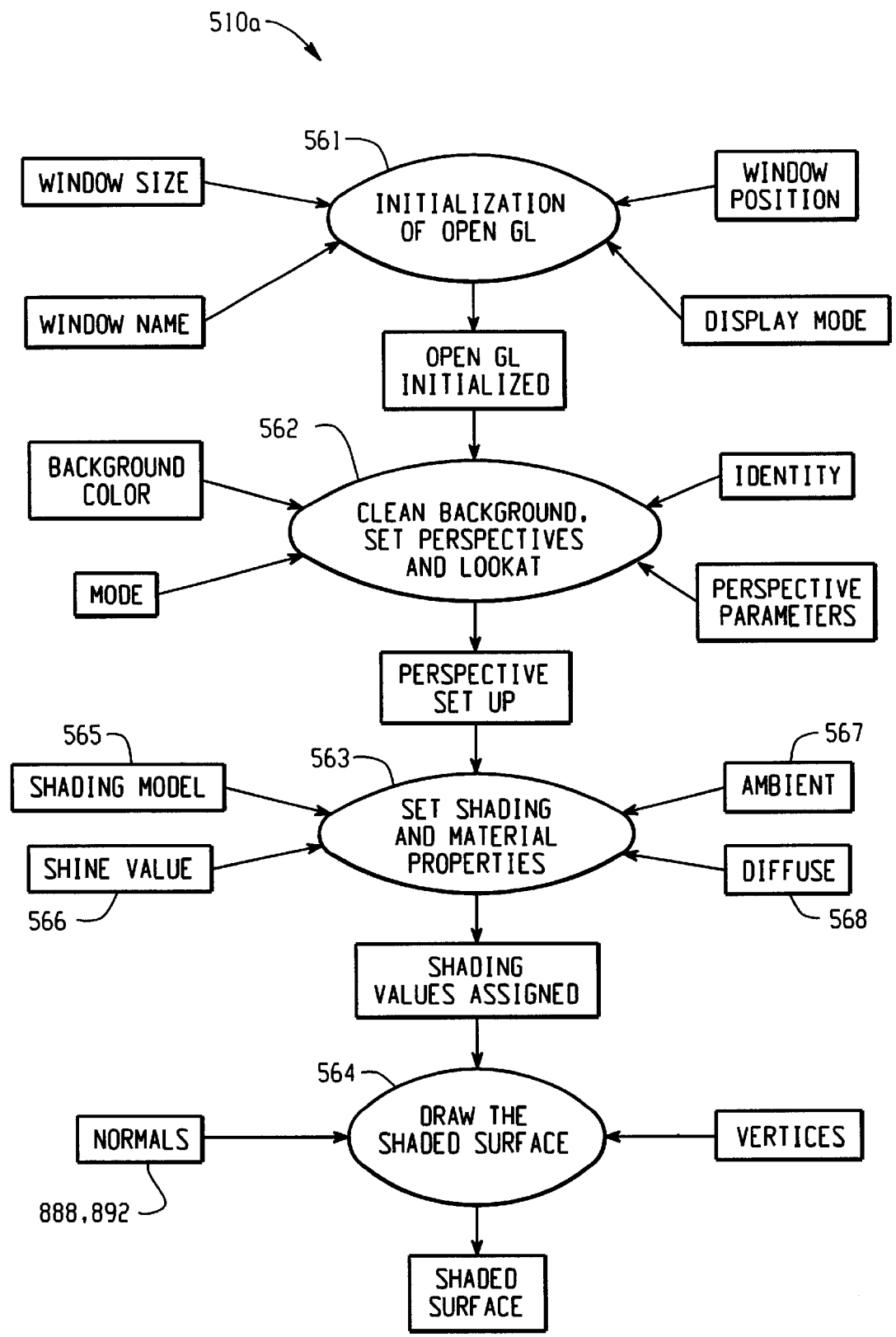
FIG. 19 is an object-process flow chart of a process seen in FIG. 13.

Referring now to FIG. 19, an exemplary user interface shell script 510a, as a component of the display 510, includes four components: an initialization of open Graphical Library interface component 561; cleaning the background 562; and setting the perspective and Lookup parameters using 563. The shading and material properties are set up using the ambient, diffusion and shine values. The normals are computed at the vertices and the output is a shaded surface.

Figure 20:
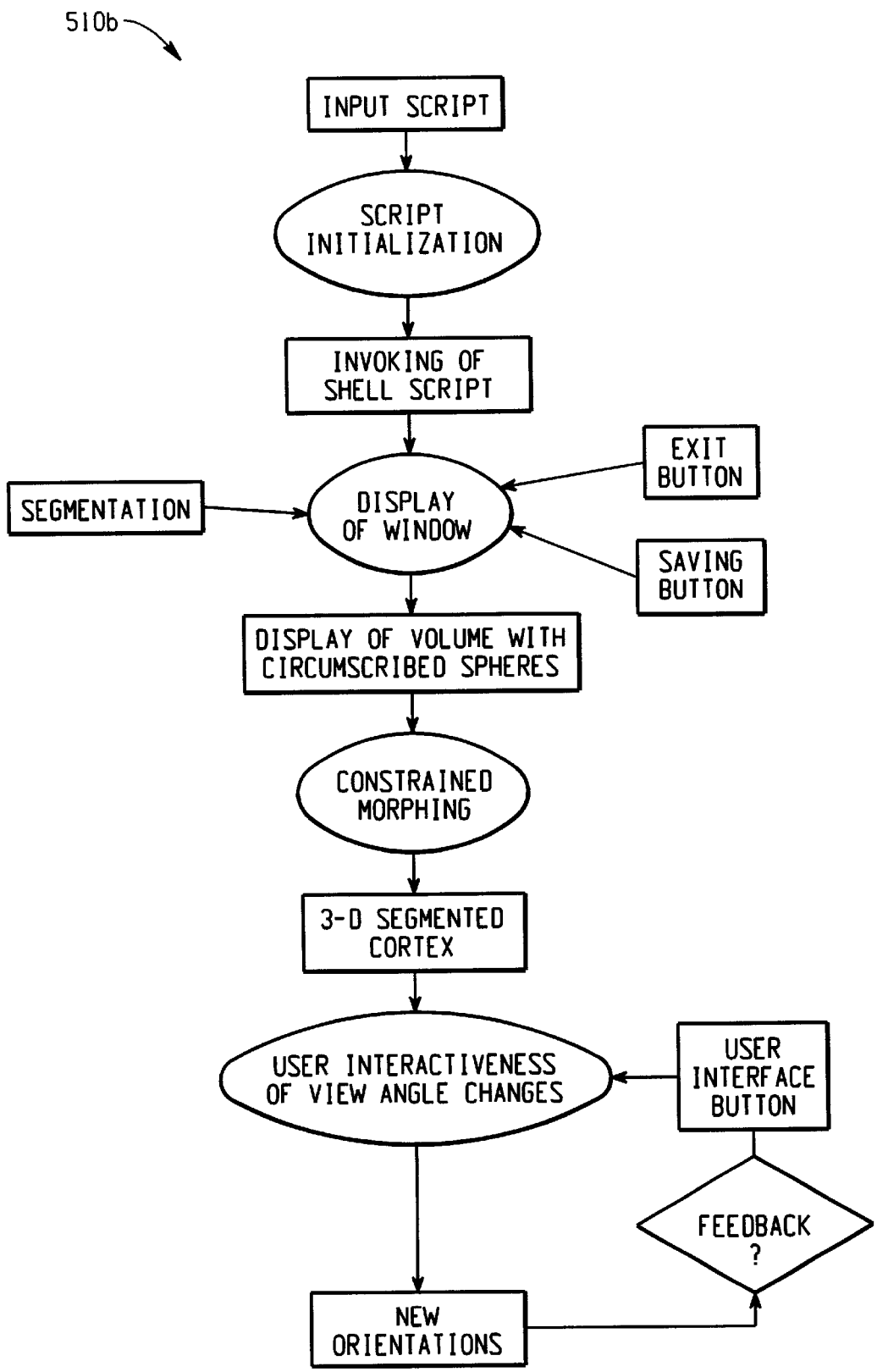
FIG. 20 is the object-process flow chart showing how one can invoke the segmentation engine from the script mode.

Referring now to FIG. 20, an exemplary method of display with feed back 510b also is a component of the display 510. Segmentation engine is acted and the results can be displayed on the window. The user can interactively manipulate the segmented results using the feedback method. The volume is loaded in the memory just once and segmented results are displayed and manipulated using the feedback method.

Figure 21:
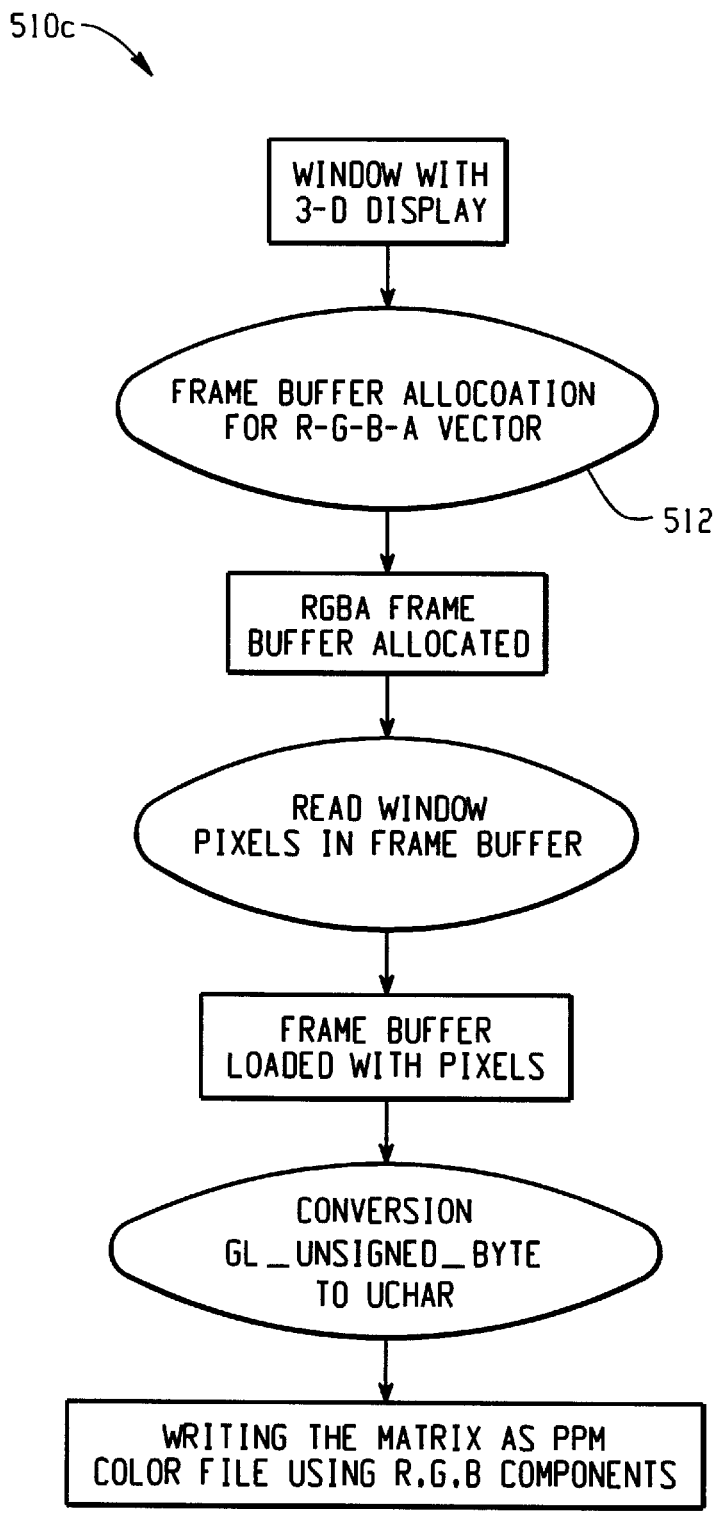
FIG. 21 is the object-process flow chart of the process showing how one can compute the RGB color images once the segmented output is displayed.

Referring now to FIG. 21, an exemplary method of saving the displayed results in color 510c is a component of the display 510 also. The Red-Green-Blue-Alpha (RGBA) buffer is allocated 512 and displayed window contents are now stored. The stored contents are converted to unsigned characters and the matrix is written into a file.

Figure 22:
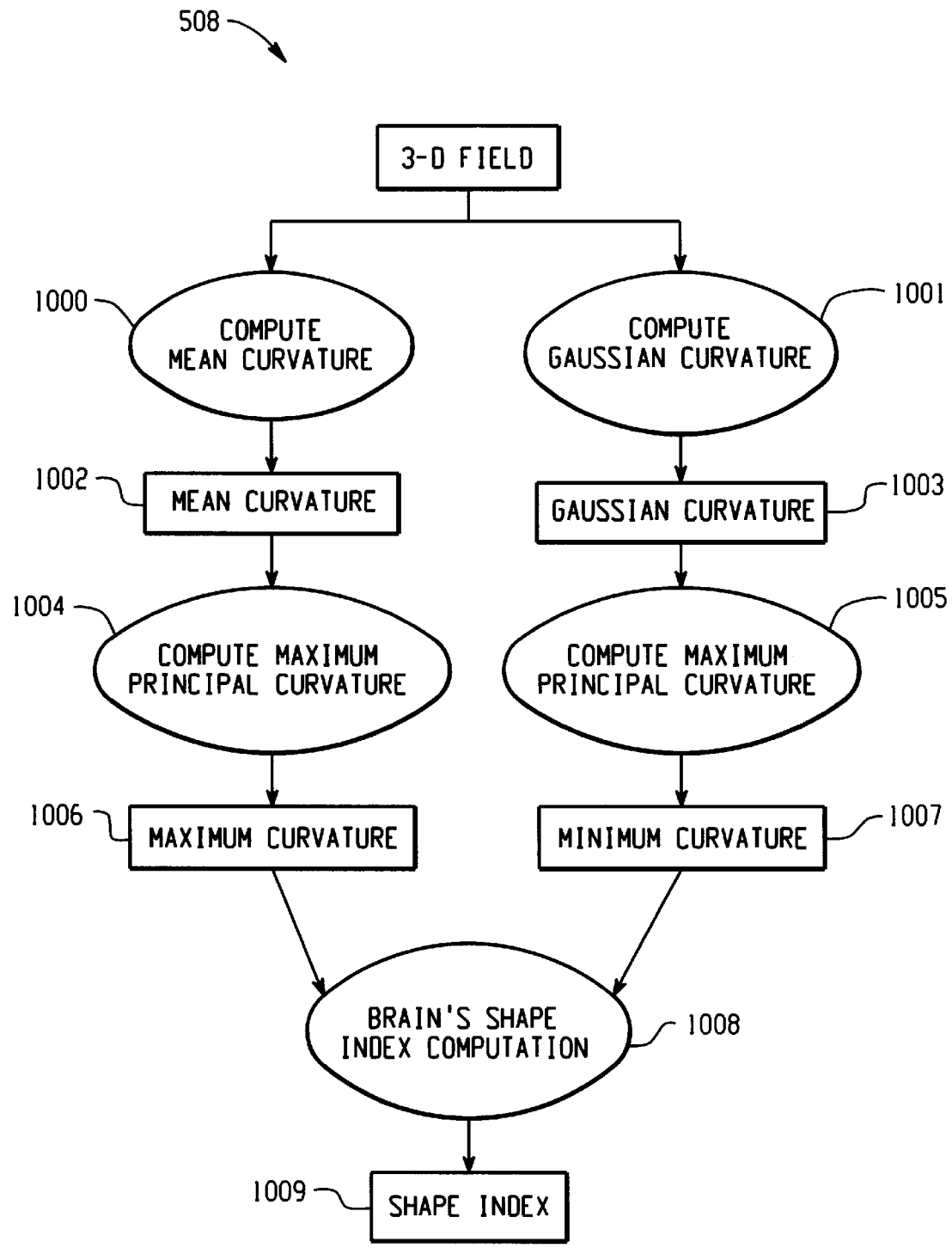
FIG. 22 shows how one can compute the shape indices of the objects using the concept from differential geometry.

Referring to FIG. 22, an exemplary method of geometric shape quantification 508 (see also FIG. 2) computes the mean 1002 and Gaussian 1003 curvatures. This is used for computing the maximum 1006 and minimum 1007 principal curvatures which are later used for shape index computation 1008. Since differential geometry is used in the level set framework driven by the edge-preserved morphologic system and the likelihood models, the geometric features are very clinically useful. They can tell about the curvatures of the shapes and curvatures for normal and abnormal cases can be compared.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An apparatus for medical imaging comprising:
   a means for retrieving image data for a volume of interest, where the image data comprises a plurality of two-dimensional image slices;
   a means for preserving edges while transforming the plurality of image slices into a three-dimensional volume;
   a means for deriving constrained image forces from the three-dimensional volume; and
   a means for identifying interfaces within the three-dimensional volume based on the derived image forces.

2. The apparatus for medical imaging as set forth in claim 1, where the means for preserving edges comprises:
   a means for mathematically morphing for each of the plurality of two-dimensional image slices into a smoothed slice; and
   a means for applying image algebra and logical operators to each smoothed slice.

3. A method of medical imaging comprising:
   retrieving image data for a volume of interest, the image data including a plurality of two-dimensional image slices;
   preserving edges while transforming the plurality of image slices into a three-dimensional volume, including:

for each of the plurality of two-dimensional image slices:
  performing an open smoothing operation and a closing smoothing operation on the slice yielding an open slice and a closed slice; and
  averaging the open slice and the closed slice.

4. The method of medical imaging as set forth in claim 3, further including:
  applying a bottom-hat smoothing process to the averaged slice.

5. A method of medical imaging comprising:
  retrieving image data for a volume of interest, the image data including a plurality of two-dimensional image slices;
  preserving edges while transforming the plurality of image slices into a three-dimensional volume: and
  identifying interfaces within the three-dimensional volume based on a predetermined constraint, the identifying including:
    deriving constrained image forces from the three-dimensional image volume.

6. The method of medical imaging as set forth in claim 5, where the identifying further comprises:
  estimating fields within the three-dimensinoal volume contained by respective narrow bands.

7. The method of medical imaging as set forth in claim 6, where the identifying further comprises:
  under the derived image force constraints and within the narrow bands, propagating the estimated fields yielding updated fields; and
  checking the updated fields for convergence.

8. The method of medical imaging as set forth in claim 7, where the identifying further comprises:
  estimating an isosurface under the edge preserved three-dimensional volume and level set framework for each of the updated fields.

9. The method of medical imaging as set forth in claim 8, where the identifying further comprises:
  surface rendering the estimated isosurfaces.

10. The method of medical imaging as set forth in claim 6, where the estimating comprises:
  generating a signed distance transform from initial shapes.

11. The method of medical imaging as set forth in claim 10, where the generating comprises:
  obtaining a vertex on one of the spheres; and
  computing distances in the narrow band to yield a shortest distance from the vertex to all vertices in a neighborhood.

12. An apparatus for processing a medical image comprising:
  a means for smoothing a volume of interest represented by a series of spatially offset images while preserving interfaces in the volume; and
  a means for segmenting the smoothed volume of interest based on level set framework and three-dimensional polyline differences, the segmenting means including:
    a means for deriving constrained morphing forces;
    a means for computing an initial likelihood distribution model over the preserved interface volume;
    a means for morphing the distribution model by applying the derived forces: and
    a means for extracting a volume from the morphed distribution model.

13. A method of processing a medical image comprising:
  smoothing a volume of interest represented by a series of spatially offset images while preserving interfaces in the volume, the smoothing including sequentially:
    selecting one of the series of spatially offset images;
    smoothing the selected image with an open-close method;
    transforming the smoothed image with a bottom-hat morphological transform; and
  segmenting the smoothed volume of interest based on level set framework and three-dimensional polyline distances.

14. A method of processing a medical image comprising:
  smoothing a volume of interest represented by a series of spatially offset images while preserving interfaces in the volume; and
  segmenting the smoothed volume of interest, the segmenting including:
    estimating forces in the volume of interest;
    based on the estimated forces, dynamically propagating initial surfaces into revised surfaces;
    extracting an isosurface from the revised surfaces;
    reinitializing the surfaces;
    checking for completion;
    if incomplete, replacing previous surfaces with the reinitialized surfaces and repeating.

15. A method of processing a medical image comprising:
  smoothing a volume of interest represented by a series of spatially offset images while preserving interfaces in the volume; and
  segmenting the smoothed volume of interest based on level set framework and three-dimensional polyline distances, the segmenting including:
    deriving constrained morphing forces;
    computing an initial likelihood distribution model over the preserved interface volume;
    morphing the distribution model by applying the derived forces; and
    extracting a volume from the morphed distribution model.

16. The method of processing a medical image as set forth in claim 15, where the deriving comprises:
  estimating a three-dimensional field distribution from initial spheres;
  computing data for selected voxels in the estimated three-dimensional field distribution;
  determining a likelihood probability for a distribution; and
  manipulating the morphing forces based on a distribution of the likelihood probability.

17. The method of processing a medical image as set forth in claim 16, where the manipulating comprises:
  adjusting the morphing forces at a variable speed depending on convergence of the initial spheres.

18. The method of processing a medical image as set forth in claim 15, where the computing comprises:
  computing a perpendicular distance between a point on an inner sphere and a corresponding point on an outer sphere.

19. An imaging apparatus comprising:
  means for open smoothing and close smoothing a selected image slice to yield an open slice and a closed slice;
  means for averaging the open slice and the closed slice; and
  means for smoothing the averaged slice into a volume image representation.

20. The imaging apparatus as set forth in claim 19, where the imaging apparatus further comprises:

means for estimating spheres in the volume image representation;

means for propagating the estimated spheres constrained by image force constraints and narrow bands surrounding the spheres to yield propagated spheres;

means for reinitializing and repropagating until the spheres converge.

21. The imaging apparatus as set forth in claim 20, where the imaging apparatus further comprises:

means for revising the volume image representation from the propagated spheres.

* * * * *